(12) United States Patent
Bayer et al.

(10) Patent No.: US 8,099,561 B2
(45) Date of Patent: Jan. 17, 2012

(54) SHARED MEMORY SYSTEM FOR A TIGHTLY-COUPLED MULTIPROCESSOR

(75) Inventors: Nimrod Bayer, Beer-Sheva (IL); Aviely Peleg, Kadima (IL)

(73) Assignee: Plurality, Ltd., Netanya (IL)

(*) Notice: Subject to any disclaimer, the term of this patent is extended or adjusted under 35 U.S.C. 154(b) by 487 days.

(21) Appl. No.: 12/267,591

(22) Filed: Nov. 9, 2008

(65) Prior Publication Data
US 2009/0125685 A1 May 14, 2009

Related U.S. Application Data

(60) Provisional application No. 60/986,659, filed on Nov. 9, 2007.

(51) Int. Cl.
*G06F 13/16* (2006.01)
*G06F 12/00* (2006.01)

(52) U.S. Cl. .......................... 711/150; 710/38; 711/168

(58) Field of Classification Search ........................ None
See application file for complete search history.

(56) References Cited

U.S. PATENT DOCUMENTS 5,202,987 A 4/1993 Bayer
6,154,816 A * 11/2000 Steely et al. .................. 711/150
6,301,637 B1 * 10/2001 Krull et al. .................... 711/112
7,673,103 B2 * 3/2010 Chaudhry et al. ............ 711/133

OTHER PUBLICATIONS

"Computer Architecture-a Quantitative Approach" by John L. Hennessy and David A. Patterson, 2nd edition, p. 638. Published in San Francisco, 1996 by Morgan Kaufmann Publishers Inc.

* cited by examiner

*Primary Examiner* — Gary Portka
(74) *Attorney, Agent, or Firm* — Law Offices of Edward Langer Adv. and Patent Attorney

(57) ABSTRACT

A shared memory system for a multicore computer system utilizing an interconnection network that furnishes tens of processing cores or more with the ability to refer concurrently to random addresses in a shared memory space with efficiency comparable to the typical efficiency achieved when referring to private memories. The network is essentially a lean and light-weight combinational circuit, although it may also contain non-deep pipelining. The network is generally composed of a sub-network for writing and a separate multi-casting sub-network for reading, whose topologies are based on multiple logarithmic multistage networks, e.g. Baseline Networks, connected in parallel. The shared memory system computes paths between processing cores and memory banks anew at every clock cycle, without rearrangement. It returns an approval reply to every core whose initiative of accessing memory leads to the successful establishment of a path and is fulfilled, or a rejection reply to every core whose initiative is not fulfilled.

17 Claims, 12 Drawing Sheets

SHARED MEMORY SYSTEM FOR A TIGHTLY-COUPLED MULTIPROCESSOR

This application claims priority from provisional application No. 60/986,659, filed Nov. 9, 2007, which is incorporated by reference herein, in its entirety, for all purposes.

FIELD OF THE INVENTION

The present invention relates to multiprocessor computers, also known as a multicore computers, and more particularly, to a multiprocessor computer having a shared memory system that allows tens of processing cores or more to concurrently and efficiently access random addresses within the shared memory.

BACKGROUND OF THE INVENTION

In a multiprocessor that comprises a desired number n of processing cores, where the term "processing core" refers to one processor contained in the multiprocessor, it is known to use one or more shared memory spaces. There is a need to implement in reality one or more apparatuses that constitute these shared memory spaces. As shown in the prior art FIG. 1, a known technique to implement a shared memory space is to divide the space among a desired number k of partial banks, and connect the n processing cores to the k memory banks through an interconnection network.

The prior art shared memory system of FIG. 1 comprises an interconnection network 20 and a collection of memory banks 22, depicted alongside the attached processing cores 24. The processing cores 24, denoted $P_1, P_2, \ldots P_n$ in FIG. 1, are connected through the interconnection network 20 to the memory banks 22, denoted $B_1, B_2, \ldots B_k$. The union of the individual memory spaces embodied by these banks constitutes the shared memory space.

Many different implementations of the interconnection network appearing in FIG. 1 are known in the prior art. Nevertheless, according to the prior art, it is not considered possible to build a shared memory system that allows tens of processing cores or more to concurrently access random addresses within the shared memory with a degree of efficiency comparable to the degree achieved by a single processing core accessing a local private memory.

A representative summary of the prior art can be found in the statement on page 638 of the second edition of the book "Computer Architecture—a Quantitative Approach", written by John L. Hennessy and David A. Patterson and Published in San Francisco in 1996 by Morgan Kaufmann Publishers Inc. The statement reads as follows: "To support larger processor counts, memory must be distributed among the processors rather than centralized; otherwise the memory system would not be able to support the bandwidth demands of a larger number of processors".

According to the prior art, the interconnection network is conceived to be a complicated and cumbersome apparatus, which cannot provide bandwidth high enough and at the same time abide by latencies low enough so as to allow access to random addresses with efficiency comparable to that of a local memory. This shortcoming is related to yet another fact concerning the prior art of multiprocessor (also called "multicore") computer construction, which is the following: the activity of synchronization and scheduling in the multicore computer is usually performed through the shared memory. Thus, one common design characteristic of prior art multiprocessors that typically leads to a hindrance in performance is laying much of the burden that stems from the synchronization and scheduling activity on the shared memory system. This activity must be conducted in one way or another in every multiprocessor. Performing the synchronization and scheduling through the shared memory system, besides imposing a burden, also impairs the efficiency of this system. This is particularly due to the development of what is known by those skilled in the art as "hot spots"; in this case, those that are related to synchronization and scheduling. Also, a complication of the shared memory system may ensue from the demand to support special synchronization primitives, such as Test&Set, Fetch&Add, or others. Such primitives typically require read and update operations that are inseparable from each other, and are performed in what is known by those skilled in the art as an "atomic" manner.

Another design characteristic of prior art multiprocessors which may also lead to a hindrance in performance is demanding that the shared memory system support read-modify transactions rather than just support simple reads and writes.

In general, prior art multicore computers which are designed so that the synchronization and scheduling activity is performed through the shared memory, are not built with an aspiration that the efficiency of accessing the shared memory will be comparable to that of accessing a local memory. This is because such computers cannot support fine computational granularity. This problem can be restated as follows: Decomposing a given algorithm into ever finer granularity levels will yield an ever increasing demand for synchronization rate, and an ever bigger ratio of overhead-activity to productive computation.

When the multicore computer is intended from the outset to perform parallel computations at a limited level of granularity, this limitation typically leads to constructing the computer in such a way that processing cores work mainly against their own local memories.

Thus, according to the prior art (see Hennessy and Patterson, cited above), it is not considered possible to build a shared memory system that allows tens of processing cores or more to concurrently access random addresses within a shared memory with a degree of efficiency comparable to that achieved by a single processing core accessing a local private memory.

A prior art attempt to overcome the problems associated with synchronization and scheduling activities was described in U.S. Pat. No. 5,202,987 to one of the co-inventors of the present invention who was also a co-inventor of the cited patent. That patent describes a multicore computer design equipped with a dedicated apparatus for synchronization and scheduling. The need to build a shared memory system that allows access with an efficiency comparable to that of a local memory arises in relation to the apparatus described in U.S. Pat. No. 5,202,987.

Prior to the publication of U.S. Pat. No. 5,202,987, both the feasibility and the need of providing a shared memory system that allows access with efficiency comparable to that of a local memory in multicore computers had not yet been established. It would therefore be desirable to provide a shared memory system that allows such an efficiency by implementing the present invention in conjunction with the invention disclosed in U.S. Pat. No. 5,202,987 to Bayer, et al., one of the co-inventors of the present invention, which is incorporated herein by way of reference.

SUMMARY OF THE INVENTION

Accordingly it is a principal object of the present invention to overcome the disadvantages and hindrances in the design of prior art systems and provide a shared memory system or several such systems in a multiprocessor computer, hereinafter also called a multicore computer as is known to those skilled in the art. The shared memory system comprises an interconnection network and a collection $B_1, B_2, \ldots, B_k$ of memory banks. This system serves a collection $P_1, P_2, \ldots, P_n$ of processing cores, which may initiate references to the shared memory concurrently.

The present invention provides a shared memory system for a multicore computer utilizing an interconnection network that furnishes the processing cores with the ability to refer to random addresses in a shared memory space with efficiency comparable to the typical efficiency achieved when referring to local private memories. Multiple such memory spaces can be implemented within the same multicore computer by applying this invention multiple times. The desired ability is accomplished thanks to a combination of traits or features of the memory system and of the entire multicore computer.

Both the need and the feasibility of overcoming the various hindrances that exist in the prior art, in order to construct the inventive shared memory system that can be accessed with efficiency comparable to that of a private memory, arise in a multicore computer that is equipped with a high flow-rate synchronizer/schedule. Such a computer is intended to efficiently support massively parallel and finely grained computations. It can be said to be tightly-coupled, in the sense that it allows a dense and intensive cooperation between the processing cores, via the shared memory and via the synchronizer/scheduler.

The interconnection network included in the inventive shared memory system is composed of a network that serves for reading as well as a separate network that serves for writing. However, the latter is omitted when the memory system is intended only for reading operations. The read network and the write network are connected in parallel to each other. The topology of both the read network and the write network is based on a plurality of logarithmic multistage networks connected in parallel.

As described further herein, one feasible type of a logarithmic multistage network is the Baseline Network. In addition to the switches contained in the logarithmic multistage networks, the interconnect network may contain other basic elements that serve for routing, connection or bridging. One usage of such elements is a reduction of the number of ports of the read or of the write network, at the side facing the memory banks; such a reduction is done when and only when the number of memory banks is smaller than the overall number of ports of logarithmic multistage networks (contained in the read or in the write network).

The inventive shared memory system computes the paths between processing cores and memory banks anew at every clock cycle. It returns an approval reply to every processing core whose initiative of accessing memory leads to an allocation of a path and is being fulfilled, and a rejection reply to every core whose initiative is not fulfilled. A processing core which receives a rejection reply resubmits its initiative at a later clock cycle. The computation of a path is done in a simple manner, based only on the submitted memory address. In this computation there is no interaction between different initiatives, except in the detection of conflicts which lead to rejections. There is no rearrangement of the paths.

The interconnection network does not perform any internal buffering or memorizing of information except, possibly, in pipeline registers. These registers serve to create three pipeline stages at most, which are: (a) definition of paths and conveyance from the processing cores to the memory banks, (b) intrinsic activity inside the memory banks, and (c) conveyance from the memory banks to the processing cores. The delivery of the approval and rejection replies can be assigned to any of these stages. The stages (a) and (b), or (b) and (c), or all three stages (a), (b) and (c), can be unified. In the latter case the pipelining is abolished altogether, which leaves the interconnection network a purely combinational system. In other cases where there are two or three pipeline stages the interconnection network still remains essentially combinational, because the pipeline registers separate the network into a few major pieces that are combinational.

The read network supports multicasts of memory contents that are requested by multiple processing cores at the same clock cycle.

The memory system exploits the phenomenon of locality of memory references to increase the bandwidth, by utilizing three different interleaving effects. The first interleaving effect is related to the decomposition of a memory address into an index of a memory bank and an internal address within that bank. The second interleaving effect is related to choosing the logarithmic multistage network that is traversed. The third interleaving effect is related to defining the internal path within the logarithmic multistage network, when this is a Baseline Network.

Depending on the number of pipeline stages, the processing cores receive the outcome of their memory access initiatives at the same clock cycle, or at the next, or at the second next.

As stated hereinbefore, a feature of the present invention is that the interconnection network does not perform internal buffering or memorization of information except of, possibly, limited buffering related to pipelining. Hence, this interconnection network essentially complies with the concept of "combinational system", known in the basic theory of digital systems. This contributes to making the interconnection network simple, lean and light-weight.

As further described hereinafter in the section entitled "The timing regime of the memory system", only in preferred embodiments of the present invention where pipelining is added is the interconnection network no longer a purely combinational system; though its essential character does not change relative to a preferred embodiment where pipelining is not added.

Another feature of the invention is the simplicity of computing the paths that are formed between processing cores and memory banks.

Another feature of the invention is that the interconnection network does not support synchronization primitives, and is designed to support memory access that is based on simple read and simple write operations only.

Another feature of the invention is that the interconnection network comprises one or more logarithmic multistage networks, and the precise quantity can be chosen so as to provide a desired number of paths between processing cores and memory banks.

Another feature of the invention is expressed in the fact that the paths between processing cores and memory banks are not long, and their associated delays are not long. Since the interconnection network is an essentially combinational system, as stated above, one can speak of these delays in the same sense as one speaks of the delays of stabilizing the functions of any combinational system.

Another feature of the invention is the separation between the apparatus serving for reading from memory and the apparatus serving for writing to memory. This separation helps to make these two dedicated apparatuses more lean and simple, and they can operate concurrently.

Another feature of the invention is the ability of the inventive shared memory system design to efficiently accommodate what is known in the art as "memory hot spots", those that are related to reading. To achieve this, the apparatus which enables the reading operation from memory supports multicasts.

In addition to the read-related hot spots, there exist two other kinds of hot spots:

1) hot spots related to synchronization and scheduling. The shared memory system is relieved from the burden of accommodating these hot spots when the multicore computer is equipped with a dedicated, high-flow-rate synchronizer/scheduler; and 2) hot spots that are also largely related to writing, apart of being related to reading, and are not related to synchronization/scheduling. These hot spots are less widespread.

The memory system described in the framework of the present invention is based on a simple, lean and light-weight interconnection network. The delays of the network are small, and the number of paths that it provides is adequate.

This memory system is suitable for production using planar technologies (although it is not limited to such technologies). Therefore it is possible to manufacture a multicore computer that applies the present invention on a silicon substrate. Furthermore, a multicore computer manufactured using a planar technology may contain more than one shared memory system built according to the present invention. In particular, it may contain a shared memory system that serves for holding data, as well as another shared memory system that serves for holding instructions.

The ability of the processing cores to access a shared memory space with a degree of efficiency comparable to the degree of efficiency achieved when an isolated processing core accesses a local private memory is one ingredient of the ability of the cores to tightly cooperate with each other. The complementary ingredient of this same ability is the efficient management of the parallel work done by the processing cores, which is accomplished when the multicore computer is equipped with a high flow-rate synchronizer/scheduler such as described in U.S. Pat. No. 5,202,987 as referenced hereinbefore. When both ingredients are fulfilled, the processing cores are given the ability to tightly cooperate with each other, and this enables the multicore computer to accommodate fine-grain parallel computations efficiently. It can then be said that the multicore computer (or synonymously the multiprocessor) is tightly-coupled.

Owing to the wholeness of features, properties, traits and principles that are described and detailed above, a shared memory system built according to the current invention is suitable for serving in a multicore computer that is tightly-coupled in the sense defined above. In this, the current invention fulfills a need that has not been fulfilled by the prior art.

Additional features and advantages of the invention will become apparent from the following drawings and description.

BRIEF DESCRIPTION OF THE DRAWINGS

For a better understanding of the invention with regard to the embodiments thereof, reference is now made to the accompanying drawings, in which like numerals designate corresponding elements or sections throughout, and in which.

DETAILED DESCRIPTION OF THE PREFERRED EMBODIMENTS

In the following description, in order to present preferred embodiments of a shared memory system for a tightly-coupled multiprocessor in accordance with the principles of the present invention, first the topology of the interconnection network is described. Thereafter, the timing regime of the memory system is described. Then the paths that are formed between processing cores and memory banks are described.

The Topology of the Interconnection Network

Figure 1:
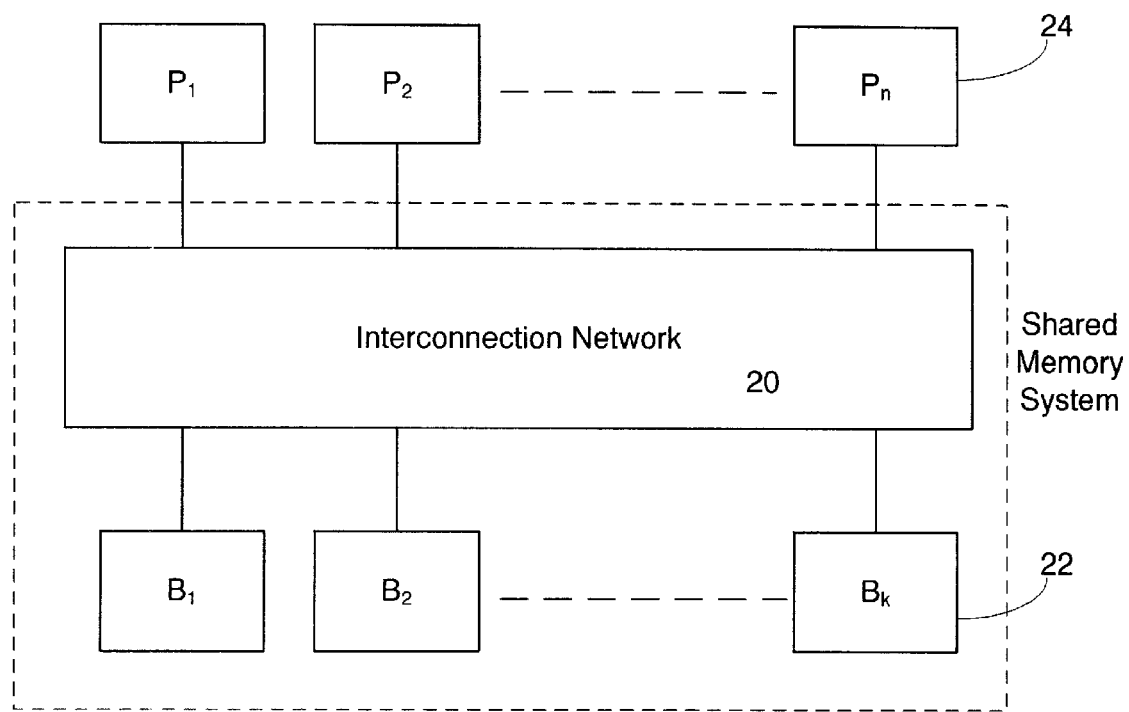
FIG. 1 shows a generalized example of a prior art shared memory system comprising an interconnection network and memory banks, connected to multiple processing cores.

FIG. 1 shows a generalized example of a prior art shared memory system comprising an interconnection network and memory banks connected, to multiple processor cores.

As stated in the section "Background of the Invention" heretofore, the interconnection network 20 of FIG. 1 is conceived to be a complicated and cumbersome apparatus, which cannot provide bandwidth high enough and at the same time abide by latencies low enough so as to allow access to random addresses with efficiency comparable to that of a local memory.

In the relevant art, as known to those of ordinary skill, when mentioned within the context of constructing a system from a given set of components, the term "topology" refers to the set of static connections between these components. The topology determines, for each component, which are the other components attached to it through a direct, fixed, physical connection. The topology may also determine the ports of the components that serve for the connections. When dealing with an interconnection network, the relevant set of components includes the basic building blocks of the network itself, namely switches and other basic elements that serve for routing, connection or bridging, as well as the elements attached to the external ports of the network. In the current context as shown in FIG. 1 (Prior Art), these external elements are the processing cores 24 (labeled $P_1, P_2 \ldots P_n$), connected at one side of the network, and the memory banks 22 (labeled $B_1, B_2 \ldots Bk$), connected at the opposite side.

Figure 2:
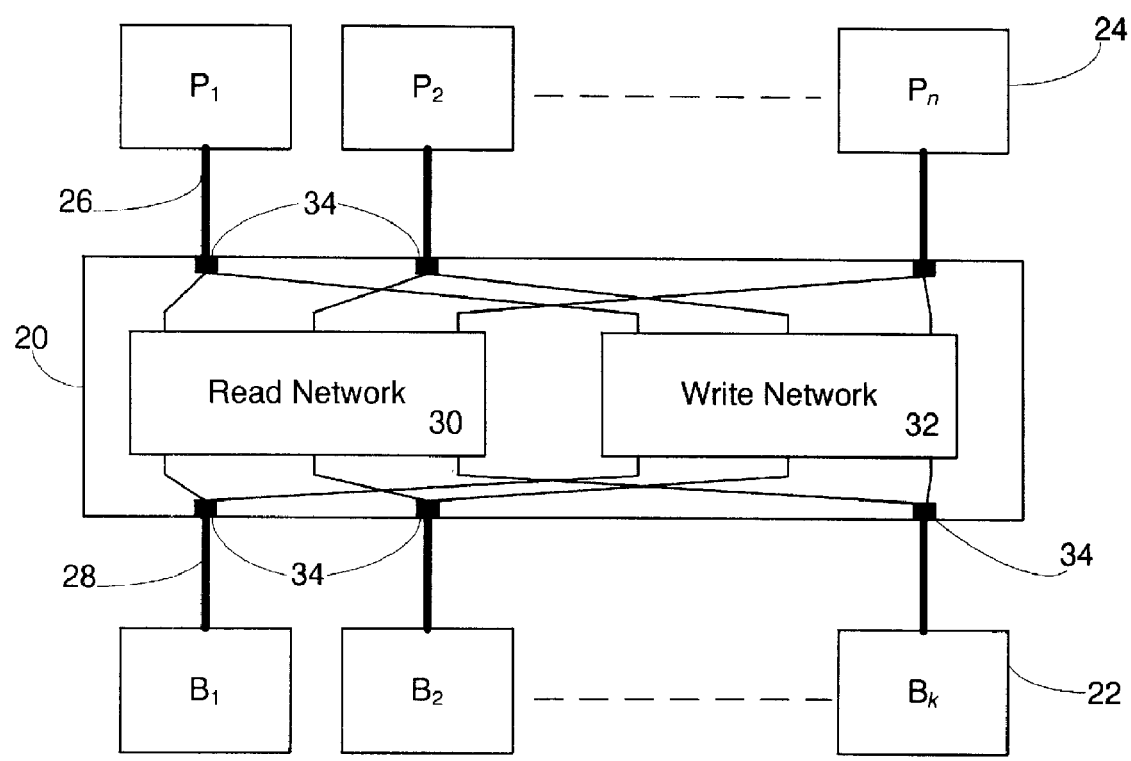
FIG. 2 shows a schematic diagram of a read network and a write network forming an interconnection network for a shared memory system, constructed and operated in accordance with the principles of the present invention.

FIG. 2 shows a schematic diagram of a read network and a write network forming an interconnection network for a shared memory system, constructed and operated in accordance with the principles of the present invention.

The presentation of the comprehensive topology of the Interconnection Network 20 is hierarchical, with two levels. At the first level, as shown in FIG. 2, Interconnection Network 20, in a preferred embodiment of the present invention, is shown as constructed from two, smaller sub-networks: a Read Network 30 serving for reading from memory and a Write Network 32 serving for writing to memory that are connected in parallel.

Hereinafter, at the second level of the hierarchical presentation, there is described how each of these two sub-networks is constructed from even smaller sub-networks whose topology is known by those skilled in the art.

Construction of the Interconnection Network from a Read Network and a Write Network Referring now to FIG. 2 in detail, Interconnection Network 20 is represented by an outer box, and corresponds to the "Interconnection Network" box (20) in FIG. 1 as in the prior art. FIG. 2 also shows the outer ports 26, 28 of the comprehensive network, with those ports 26 that are depicted at the top of FIG. 2 being intended to be connected to processing cores 24, and those ports 28 that are depicted at the bottom being intended to be connected to memory banks 22. The two inner boxes 30, 32 represent the Read Network 30 and the Write Network 32, respectively. The Read Network 30 serves for operations of reading from memory, and the Write Network 32 serves for operations of writing to memory. The black squares at the points of intersection between the ports 26 of Read Network 30 and those of Write Network 32 represent elements 34 of routing, connection or bridging. These elements 34, when needed, are among the basic building blocks of an interconnection network.

Construction of Interconnection Network 20 from separate read and write networks 30, 32 that are connected in parallel as described above has the following advantage: the number of paths between processing cores 24 and memory banks 22 that the comprehensive Interconnection Network 20 can offer is increased, in comparison to a single network that undertakes both the read operations and the write operations. On the other hand, the overall amount of resources that are needed to implement the two sub-networks is not increased at the same proportion, because by being intended to transfer data only in one direction, each of the two sub-networks is simpler and more efficient than the alternative single network that transfers data both ways.

Sometimes it is required to build a shared memory system that serves only for reading. This may happen, for example, when building an instruction memory for a computer that is based on what is known by those skilled in the art as Harvard Architecture, which separates instructions from data. In such a case, the Interconnection Network 20 comprises only the read network 30 and does not contain a write network 32.

The Topology of the Read Network and of the Write Network

In accordance with the principles of the present invention, there is a second level of the hierarchical presentation of the topology of Interconnection Network 20. Both the read network 30 and the write network 32 are constructed from even smaller sub-networks (whose topology is known by those skilled in the art). The distinction between read network 30 and write network 32 pertains only to the formation of paths, as explained hereinafter. As far as the topology is concerned, there is no distinction between read network 30 and write network 32, although this does not imply that the two networks must be identical: some parameters and choices can be set differently, as explained below.

The common topology of read network 30 and of write network 32 is based on connecting a desired number m of sub-networks in parallel. The number m is later referred to as the "duplication factor". The sub-networks are of the type known by those skilled in the art as "logarithmic multistage networks" (see FIG. 4), and the number of ports that they possess at each of their two sides is n, the number of processing cores.

In a preferred embodiment, these logarithmic multistage networks are composed from uniform switches. Every path from one side of such a network to the opposite side passes through a series of switches of length equal to the logarithm according to base b of n, where b is the number of ports at each of the two sides of the switches. Two examples for logarithmic multistage networks that are known by those skilled in the art are the Omega Network and the Baseline Network.

The Baseline Network is a generalized concept that is recognized in the prior art. It is known to those skilled in the art how to construct a Baseline Network with a given number of ports at each side, composed from switches whose number of ports at each side is also given. The topology of a Baseline Network that possesses n=8 ports at each side and is composed from switches that have b=2 ports at each side is shown in FIG. 3.

Figure 3:
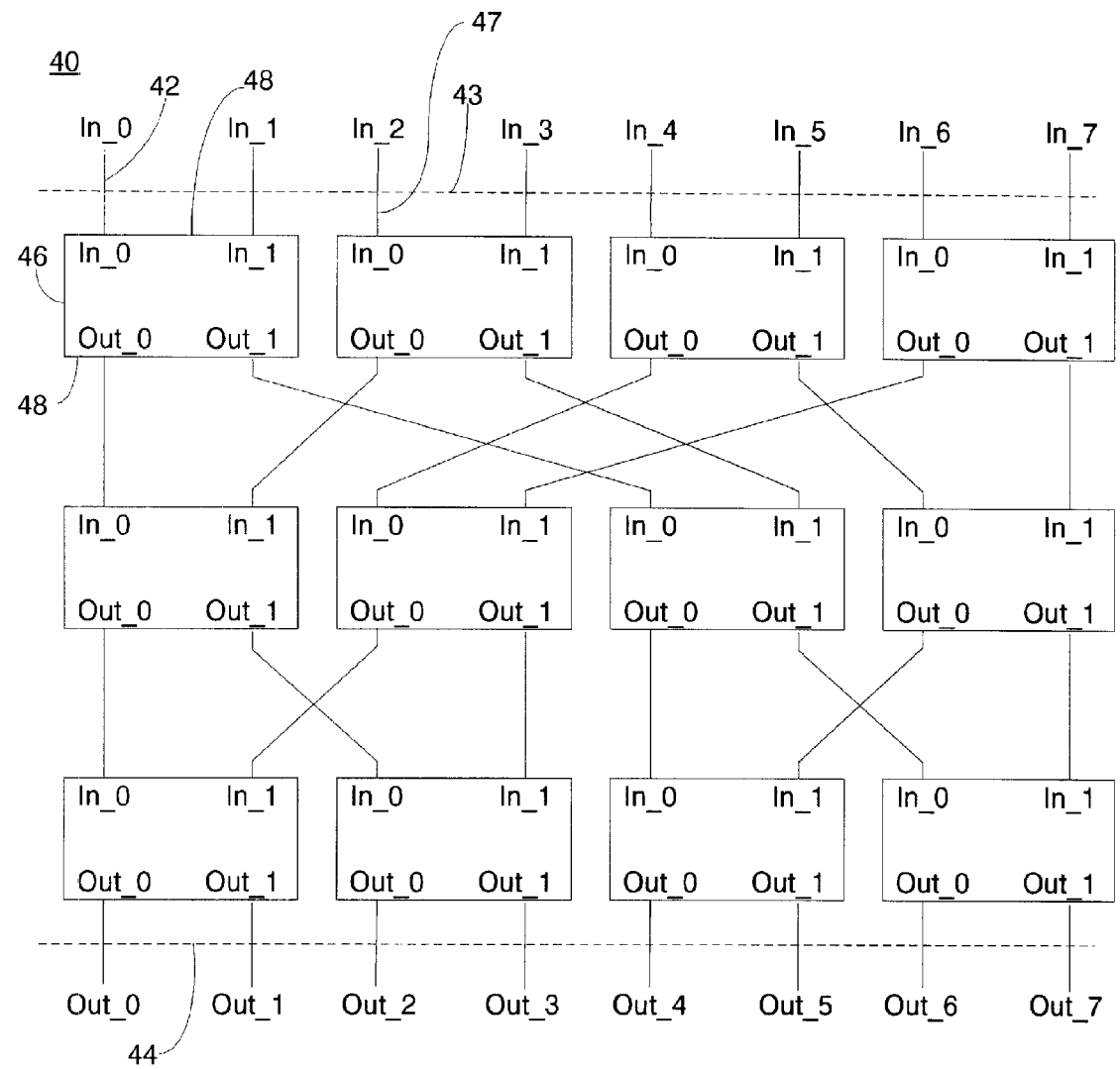
FIG. 3 shows the topology of a known type of interconnection network configured as a Baseline Network with eight ports at each side in accordance with the principles of the present invention.

In FIG. 3 there is shown a Baseline Network 40 topology with eight ports 42 at each side 43, 44, which is composed from switches 46, each of which has two ports 47 at each side 48. The ports at one side 43 of the network are labeled In_0 to In_7, and those at the other side 44 are labeled Out_0 to Out_7. The numbers 0 to 7 serve here as indices. The network comprises three rows of switches 46, which constitutes its basic building blocks. Every path from one of the external ports labeled In_0 to In_7 to one of the external ports labeled Out_0 to Out_7 at the other side of the network passes via one and only one switch 46 belonging to each of these three rows.

According to the terminology prevalent in the prior art, the three rows are referred to as the three stages of the network. The following convention is adopted in the current figure: Ports through which initiatives that have originated at the processing cores 24 enter are labeled with names that contain the word "In", while ports through which these initiatives exit on their way towards the memory banks 22 are labeled with names that contain the word "Out"; this applies for the ports of the network itself and for the ports of its building blocks alike. The reactions to the cores' initiatives travel in the opposite direction, though, and therefore each port, no matter whether its name contains the word "In" or the word "Out" typically includes both input and output signals.

In general, when a Baseline Network is physically-geometrically stretched out on a planar surface in a manner that corresponds to FIG. 3, the following holds true: if the Baseline Network is bound within a rectangle, then the maximal geometrical total length of any path from a port at one side of the Baseline Network to a port at the other side does not exceed the length of a diagonal of the bounding rectangle. This is a useful property of Baseline Networks.

As stated hereinbefore, the common topology of read network 30 and of write network 32 (see FIG. 2) is based on connecting m logarithmic multistage networks in parallel, with each of these m networks possessing n ports at each side.

The parameter m, which is referred to here and hereinafter as the "duplication factor", assumes a desired value that is equal to or greater than one ($m \geq 1$); n being the number of processing cores 24 (see FIG. 2).

Figure 4:
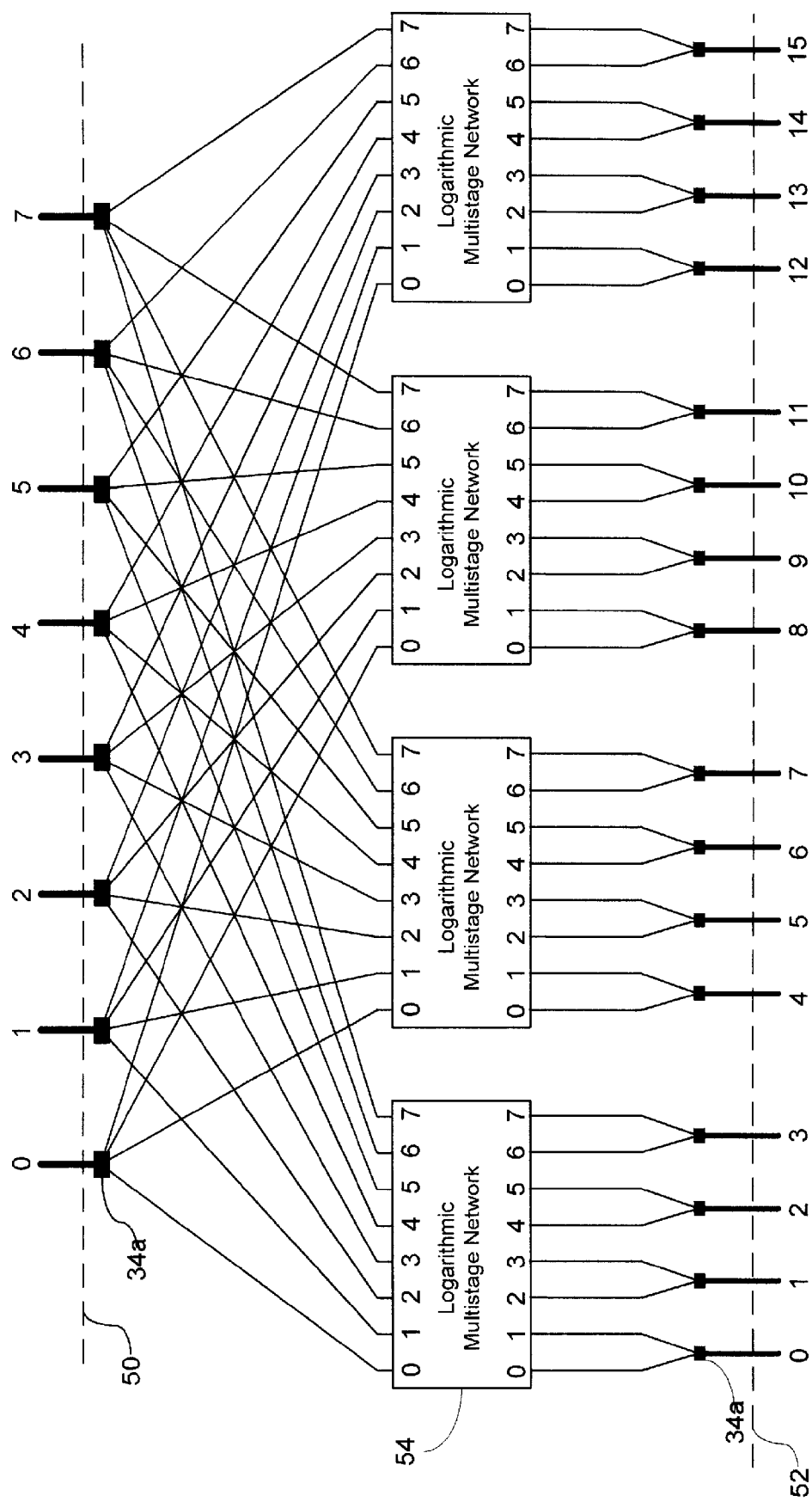
FIG. 4 shows an example of the common topology of a read network and a write network based on logarithmic multistage networks.

FIG. 4 shows an example of the common topology of a read network and a write network based on logarithmic multistage networks.

Referring now to FIG. 4, in this example, the number n of processing cores 24 (see FIG. 2) is 8, and the number k of memory banks 22 (see FIG. 2) is 16. Thus, the Logarithmic Multistage Networks 54 possesses 8 ports that are indexed 0 to 7 at one side 50 (the side that is facing processing cores 24), and 16 ports that are indexed 0 to 15 at the other side 52 (the side that is facing memory banks 22). Four Logarithmic Multistage Networks 54 are connected in parallel in this example, namely the duplication factor m is 4. Every one of the four Logarithmic Multistage Networks 54 has n ports at each side. The black squares at the upper part of the figure as well as those at the lower part of the figure represent elements 34a of routing, connection or bridging which are among the basic building blocks of an interconnection network.

Every external port of the network, of those that have indices 0 to n−1 and are depicted at the upper part of FIG. 4, is connected through an element 34a of routing, connection or bridging, if it exists, to the corresponding port (the one that has the same index) of each one of the Logarithmic Multistage Networks 54. Also, every external port of the network, of those that have indices 0 to k−1 and are depicted at the lower part of the figure, is connected through element 34a to (m×n)/k ports with successive indices of a Logarithmic Multistage Networks 54; in this example, every one of the 16 external ports depicted at the lower part of FIG. 4 is connected to two ports with successive indices of Logarithmic Multistage Networks 54.

The topology exemplified in FIG. 4 for n=8 processing cores, k=16 memory banks and duplication factor m=4 is clear as a general concept, which applies also when the values of the parameters are different. The type of the logarithmic multistage networks may also vary. Yet in order for the topology to be proper it is necessary that the product of n and m will be equal to k or bigger than k, namely, in common mathematical notation, $k \leq n \times m$. One other example for a possible set of values of the parameters, which also represents a preferred embodiment of the present invention, is as follows: The number n of processing cores is 256, the value of the duplication factor m is 8 and the number k of memory banks is 512.

For the topology to be definite it is necessary that the indexation of the ports of the logarithmic multistage networks be definite. This indexation is indeed defined and agreed in descriptions of the Omega Network and of the Baseline Network that are known by those skilled in the art.

In order that all the processing cores 24 (see FIG. 2) will be able to simultaneously access memory banks 22 (see FIG. 2), it is necessary, in a preferred embodiment of the present invention, that the number k of memory banks 22 will not be smaller than the number n of processing cores 24, namely $n \leq k$.

In one class of preferred embodiments, the number n of processing cores 24, the number k of memory banks 22 and the duplication factor m are whole powers of two.

Another class of preferred embodiments is obtained from the former class by actually connecting less than n processing cores 24 (see FIG. 2) to the memory system, leaving a collection of processing cores 24 whose size is not a whole power of two, while retaining the original values of the number k of memory banks 22 (see FIG. 2) and of the duplication factor m. This reduction of the number of processing cores 24 may allow a limited reduction of the interconnection network 20 (see FIG. 2) as well. However, the memory system and its parameters do not undergo an essential change, because the number of ports of each of Logarithmic Multistage Networks 54, at the side that is near memory banks 22, remains the original number n.

The advantage in having a greater value for the duplication factor m is that the number of paths between processing cores 24 and memory banks 22 is also increased.

Although the value of the duplication factor m may differ between the read network 30 and the write network 32 (see FIG. 2), selecting an identical value has the following advantage: in a physical-geometrical implementation of the interconnection network 20, the read network 30 and the write network 32 can be laid in parallel to each other, with every building block, such as switches 46 (see FIG. 3), and every link inside the read network 30 placed next to the corresponding building block or link of the write network 32. Such a layout can be more area-efficient and wiring-efficient, as well as simpler to design.

The Timing Regime of the Memory System

Clock Cycles

The memory system presented herein is based on dividing the time into intervals or slices known by those skilled in the art as "clock cycles". The same common division of the time applies, within the context of a given memory system, to all the processing cores 24 (see FIG. 2) that are connected to the memory system, as well as to any timed resource within the memory system.

Every processing core 24 is eligible for initiating one access to a memory address that belongs to the memory space embodied by the given memory system, at every clock cycle. The initiatives taken by processing cores 24 lead to a process of defining paths between processing cores 24 and memory banks 22, via interconnection network 20. This path definition process is performed anew, once at every clock cycle. The paths thus defined are not partial, but rather full paths that begin in processing cores 24, traverse interconnection network 20, and terminate in memory banks 22.

Approvals and Rejections of the Processing Cores' Initiatives

In general, as a result of contests over the ports of the switches and of the other basic elements of an interconnection network, the memory system might be unable to fulfill all the initiatives submitted by processing cores at a given clock cycle. In accordance with the present invention, a processing core 24 (see FIG. 2) whose initiative is indeed fulfilled receives an approval reply, while a processing core 24 whose initiative is not fulfilled receives a rejection reply. A processing core 24 that receives a rejection reply typically retries to submit its initiative at a later clock cycle. The resubmission is done in the same way as the original submission, as though the latter did not take place at all.

The Pipeline Stages of Memory Access

The activity that takes place in order to fulfill the simultaneous accessing of memory by numerous processing cores includes the following activity ingredients, labeled A to G:

Ingredient A: submission of the processing cores' initiatives;

Ingredient B: definition of paths between processing cores and memory banks in the interconnection network, which will carry contents signifying data, addresses and control;

Ingredient C: transfer of approval and rejection replies to those processing cores that initiated memory accesses;

Ingredient D: reading from memory banks, pursuant to read initiatives;

Ingredient E: transfer of contents that were read from memory banks to the processing cores that initiated the reading;

Ingredient F: transfer of contents from those processing cores that initiated write operations to the memory banks wherein the writing should take place; and Ingredient G: writing to memory banks, pursuant to write initiatives.

In accordance with one preferred embodiment of the present invention, all the activity ingredients that stem from the same set of initiatives are performed at one clock cycle; in other words, the activity ingredients B, C, D, E, F and G are performed at the same clock cycle as the ingredient A from which they stem.

In accordance with a second preferred embodiment, the activity ingredients B, C, D, F and G are performed at the same clock cycle as ingredient A from which they stem; however, ingredient E is performed at the subsequent cycle, at which a fresh set of initiatives is already submitted. This second preferred embodiment is based on what is known by those skilled in the art as a "pipeline". The advantage of pipelining is the potential shortening of the duration of the clock cycles. The number of pipeline stages is two in this second preferred embodiment of the present invention, as illustrated in the following diagram:

| Activity ingredient | First stage | Second stage |
|---|---|---|
| Ingredient A: Submission of initiatives | ✓ | |
| Ingredient B: Definition of paths | ✓ | |
| Ingredient C: Approval/rejection replies | ✓ | |
| Ingredient D: Reading from memory | ✓ | |
| Ingredient E: Transfer of contents that were read | | ✓ |
| Ingredient F: Transfer of contents to write | ✓ | |
| Ingredient G: Writing to memory | ✓ | |

In accordance with a third preferred embodiment of the present invention, the activity ingredients B, D, F and G are performed at the same clock cycle as the ingredient A from which they stem; however, the two ingredients C and E are performed at the subsequent clock cycle.

Like the second preferred embodiment described hereinbefore, the third preferred embodiment is also based on two pipeline stages, the difference being in the apportionment of the activity between the pipeline stages. This is made clear using the diagram below, which pertains to the third preferred embodiment:

| Activity ingredient | First stage | Second stage |
|---|---|---|
| Ingredient A: Submission of initiatives | ✓ | |
| Ingredient B: Definition of paths | ✓ | |
| Ingredient C: Approval/rejection replies | | ✓ |
| Ingredient D: Reading from memory | ✓ | |
| Ingredient E: Transfer of contents that were read | | ✓ |
| Ingredient F: Transfer of contents to write | ✓ | |
| Ingredient G: Writing to memory | ✓ | |

In accordance with a fourth preferred embodiment of the present invention, activity ingredients B, C and F are performed at the same clock cycle as ingredient A from which they stem; the two ingredients D and G are performed at a subsequent cycle, and the last ingredient E is performed one more cycle later. The following diagram illustrates the three pipeline stages of the fourth preferred embodiment:

| Activity ingredient | First stage | Second stage | Third stage |
|---|---|---|---|
| Ingredient A: Submission of initiatives | ✓ | | |
| Ingredient B: Definition of paths | ✓ | | |
| Ingredient C: Approval/rejection replies | ✓ | | |
| Ingredient D: Reading from memory | | ✓ | |
| Ingredient E: Transfer of contents that were read | | | ✓ |
| Ingredient F: Transfer of contents to write | ✓ | | |
| Ingredient G: Writing to memory | | ✓ | |

It is clear from the above description that various preferred embodiments of the present invention may feature different pipeline configurations. Among these configurations there are included: the one on which the first preferred embodiment described above is based, where all the activity is performed at the same clock cycle so in fact there is no pipeline at all; the configurations with two pipeline stages on which the second and third preferred embodiments above are based; and the configuration with three pipeline stages on which the fourth preferred embodiment above is based. Additional pipeline configurations where the activity ingredients A to G are apportioned differently among the pipeline stages may give rise to additional preferred embodiments of the present invention.

In order to clarify this exhaustively, the following explanation presents how the various pipeline configurations can be derived from a common scheme that includes the following three generic stages (a), (b) and (c):

(a) The stage of conveyance from the processing cores to the memory banks;

(b) The stage of intrinsic activity inside the memory banks; and (c) The stage of conveyance from the memory banks to the processing cores.

Different pipeline configurations may rely either on leaving the three stages (a), (b) and (c) as disjoint stages; or on unifying (a) and (b) into one stage so that altogether there remain two stages; or on unifying (b) and (c) into one stage so that here too there remain two stages; or on unifying the three stages (a), (b) and (c) into one stage, so that, in fact, no pipeline remains. The activity ingredients A, B and F always belong, according this scheme, to stage (a). The ingredients D and G always belong to stage (b). The ingredient E always belongs to stage (c). Finally, the activity ingredient C may belong according this scheme to either one of the three stages (a), (b) or (c).

To demonstrate the relationship between the preferred embodiments of the present invention described hereinbefore and the current scheme, it is pointed out that the description of both the second and the third preferred embodiments are based on unifying the stages (a) and (b) into one stage. These two embodiments differ, however, in the stage at which the activity ingredient C is performed: In the second preferred embodiment it is stage (a) or (b), whereas in the third preferred embodiment it is stage (c).

The Combinational Character of the Interconnection Network

The interconnection network 20 (see FIG. 2) accepts the initiatives of the processing cores 24 plus signals generated by the memory banks 22 as input variables. From these variables interconnection network 20 computes the following functions $f_1$ to $f_6$:

$f_1$: the paths that should be defined between processing cores 24 and memory banks 22, and are expressed in the switching states of the basic elements from which interconnection network 20 is built and;

$f_2$: the data contents that should appear on the ports of various memory banks 22, and which originate from write initiatives of processing cores 24;

$f_3$: internal addresses that should appear on the address ports of memory banks 22;

$f_4$: control values that should appear on the control lines of memory banks 22, to instruct them to perform read or write operations;

$f_5$: the approval and rejection replies to the initiatives of processing cores 24; and $f_6$: the data contents that should appear on the ports of various processing cores 24 which were dispensed by memory banks 22 in response to read initiatives of these processing cores 24.

In a preferred embodiment of the present invention that is not based on pipelining, the computation of the functions $f_1$ to $f_6$ above does not depend on the state of the interconnection network 20 (see FIG. 2) in previous clock cycles. Hence, in such a preferred embodiment, the interconnection network 20 complies with the concept of "combinational system", known in the basic theory of digital systems.

Figure 5:
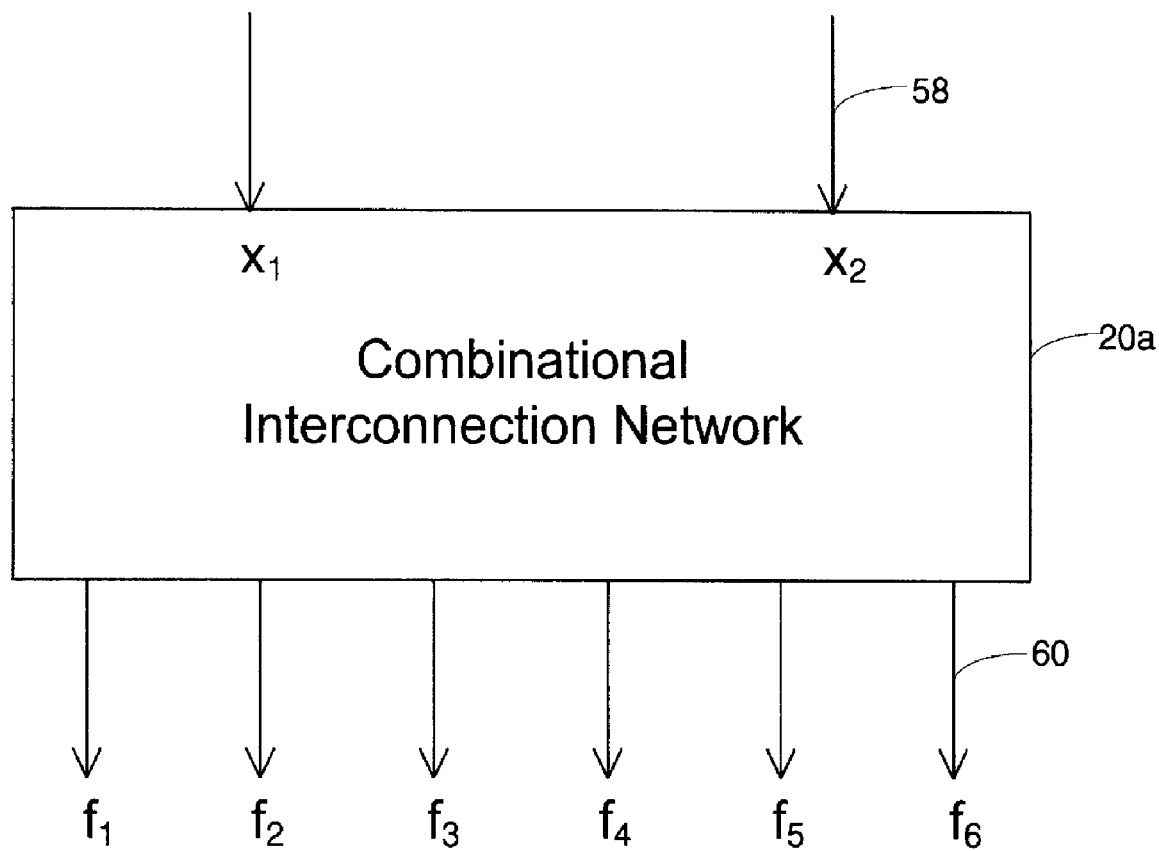
FIG. 5 shows the aggregated variables that are input to the interconnection network, and the aggregated values computed as functions of these variables, wherein the network complies with the concept of a combinational system in accordance with a preferred embodiment of the present invention.

FIG. 5 shows the aggregated variables that are input to the interconnection network, and the aggregated values computed by the interconnection as functions of these variables, wherein the network complies with the concept of a combinational system in accordance with preferred embodiments of the present invention that are not based on pipelining.

Referring now to FIG. 5, there is depicted a combinational interconnection network 20a as a single block that receives inputs 58 and generates outputs 60. The outputs 60 indicated by $f_1$ to $f_6$ are functions of the current values of the inputs 58, namely the variables $x_1$ and $x_2$, provided that the system has been let enough time to stabilize.

Figure 6:
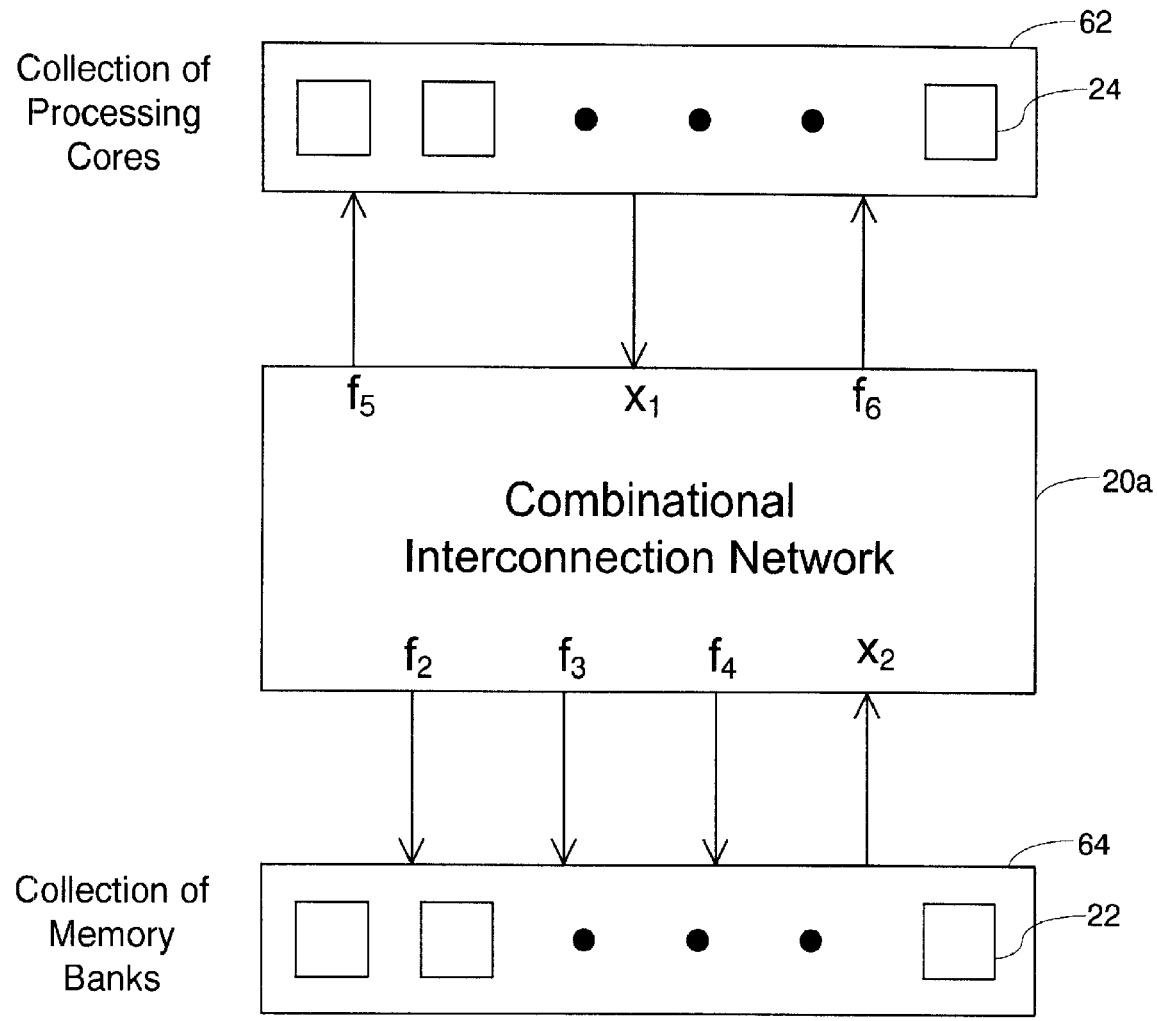
FIG. 6 shows the combinational interconnection network of FIG. 5 together with the processing cores and memory banks which produce the variables and use the values computed as functions of these variables.

FIG. 6 depicts a combinational interconnection network 20a as appearing in FIG. 5, together with a collection 62 of processing cores 24 and a collection 64 of memory banks 22, which produce the values of the variables $x_1$ and $x_2$, which are aggregates of information, and use their functions $f_1$ to $f_6$. The values of $f_1$ to $f_6$, whose meanings are defined hereinbefore, are also aggregates of information. The variable $x_1$ constitutes the initiatives of the collection 62 of processing cores 24, while the variable $x_2$ constitutes signals generated by the collection 64 of memory banks 22. Note that FIG. 6 does not depict $f_1$ because it is used internally by the interconnection network itself.

Being a combinational system contributes to making combinational interconnection network 20a simple, lean and light-weight. It also makes this inventive network fundamentally different from prior art interconnection networks which are arranged such that data, addresses and control values make a journey that may last multiple clock cycles from their processing cores to their memory banks or backwards.

In such other networks, these data, addresses and control values, as well as partial or complete paths that have been allocated, are part of a complex state that must be remembered from one clock cycle to the next. Typically, this leads to the addition of buffer memories and complicated control mechanisms.

In contrast to such other networks, the light-weight combinational interconnection network 20a presented in the framework of the present invention can be considered as similar to what is known by those skilled in the art as a "carry-look-ahead" adder: Both are combinational systems in which signal propagation delays depend logarithmically on the number of variables. A carry-look-ahead adder is considered a very compact and fast system.

The simplicity and compactness of the inventive combinational interconnection network 20a shown in FIG. 6, as well as the fact that the execution of every memory access is completed within a single clock cycle contribute to its serving the processing cores 24 with an efficiency comparable to that of local private memory. However, it is also necessary that the delay of combinational interconnection network 20a will be small enough, and that the number of paths that the network can provide between processing cores 24 and memory banks 22 will be large enough. The present invention indeed satisfies these requirements, as described further herein, in the subsection entitled "The delay of the interconnection network", and the section entitled "The paths formed in the memory system".

In preferred embodiments of the present invention that are based on pipelining, it is necessary to add what is known by those skilled in the art as "pipeline registers" to the interconnection network.

Apart from the pipeline registers, all the rest of the interconnection network is combinational. The pipeline registers are implanted in this combinational system without breaking it up into small fragments: the function $f_1$ defined hereinbefore is still computed in its entirety from the variable $x_1$ introduced above, in a single clock cycle. Also, all of the functions $f_2$ to $f_6$ are computed from $x_1$, from the other variable $x_2$ introduced above and from $f_1$ (or from a subset of $x_1$, $x_2$ and $f_1$), in a single clock cycle (which is the same cycle, when the interconnection is not based on pipelining).

The following table details which pipeline registers are needed in various preferred embodiments based on pipelining.

| The preferred embodiments wherein the pipeline register is required | Pipeline register's location | Pipeline register's role |
|---|---|---|
| Embodiments wherein stage (a) of the common scheme above is not unified with stage (b). | At the end of the interconnection network to which the memory banks 22 are attached. | This pipeline register hinders the transfer of the values of the functions $f_2$, $f_3$ and $f_4$ defined above to the memory banks 22 for one clock cycle. |
| Embodiments wherein stage (b) of the common scheme above is not unified with stage (c). | At the end of the interconnection network to which the memory banks 22 are attached. | This pipeline register hinders the transfer of the variables from which the function $f_6$ defined above is computed from the memory banks 22 to the interconnection network for one clock cycle. |
| Any embodiment based on pipelining. | In an embodiment with two pipeline stages the register is distributed all through the interconnection network, with every basic building block of the network hosting a segment of the register. In an embodiment with three pipeline stages there are two registers of this kind, connected one after the other. | In an embodiment with two pipeline stages, this pipeline register holds the value of the function $f_1$ defined above, as computed in the previous clock cycle. In an embodiment with three pipeline stages, the second among the two registers holds the contents that the first register held in the previous clock cycle, thus creating a delay of two cycles. A segment of this register that is hosted by a given building block of the interconnection network contains information pertaining to the switching state of the same building block. |

| The preferred embodiments wherein the pipeline register is required | Pipeline register's location | Pipeline register's role |
|---|---|---|
| | | The contents of this register (or of the second among the two registers in embodiments based on three pipeline stages) serve as variables of the function $f_6$ defined above. The contents of this register (or one of the two registers, in embodiments based on three pipeline stages) may also serve as variables of the function $f_5$, depending on the pipeline stage where the activity ingredient C (described hereinbefore) is performed. |

We now refer again to the four preferred embodiments discussed in the subsection entitled "The pipeline stages of memory access".

Figure 7:
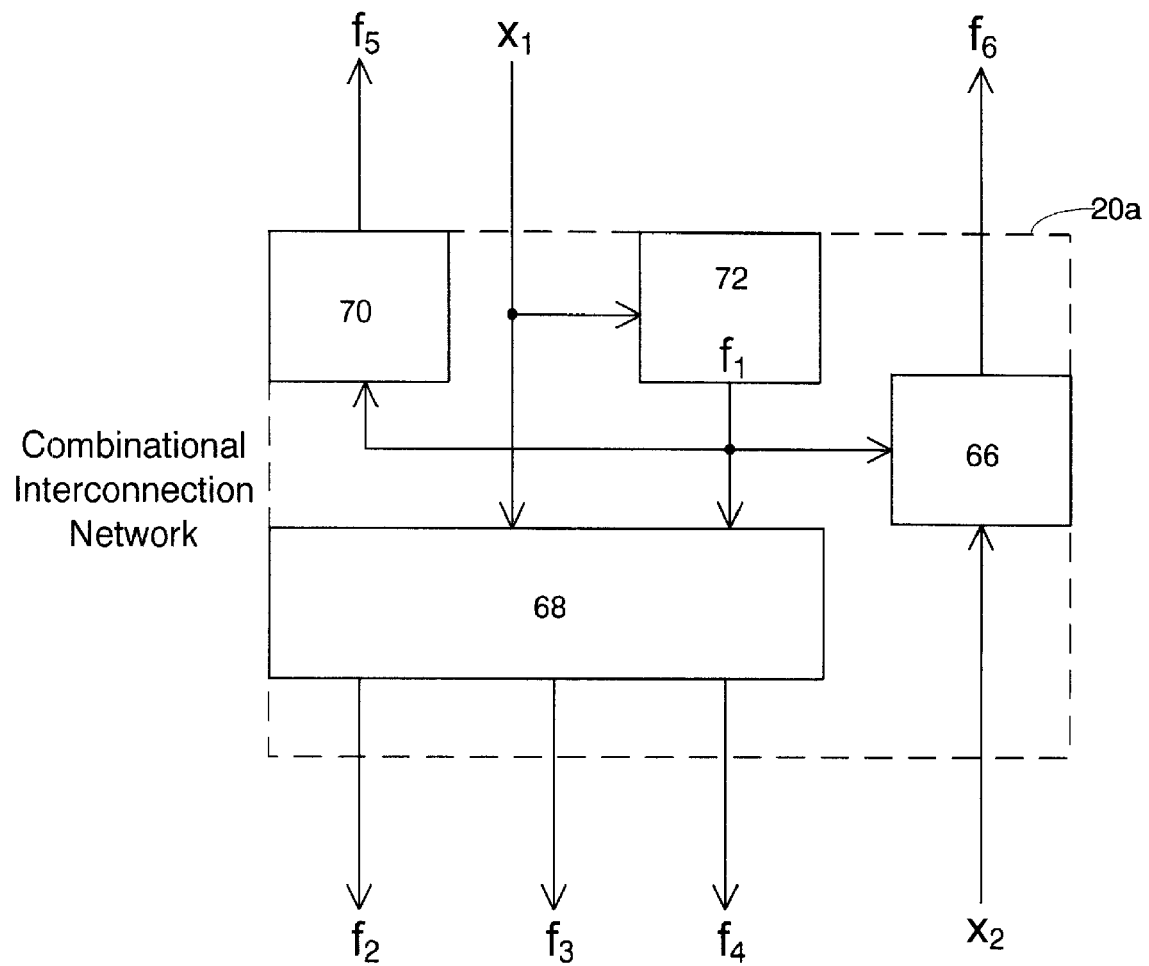
FIG. 7 shows the combinational interconnection network of FIG. 5, but with a decomposition of the overall combinational system into combinational sub-blocks.

FIG. 7 shows the combinational interconnection network of FIG. 5, but with a decomposition of the overall combinational system into combinational sub-blocks. This first preferred embodiment among the four mentioned is not based on a pipeline, and thus the combinational interconnection network 20a of this embodiment complies with FIG. 5.

The sub-blocks 66, 68, 70, and 72 shown in FIG. 7 remain unbroken in any preferred embodiment of the present invention based on pipelining. Hence, the essentially combinational character of the interconnection network 20a is preserved unharmed also in preferred embodiments that are based on pipelining.

The other three preferred embodiments, which are based on two or three pipeline stages, are described hereinbefore using diagrams that specify which activity ingredients are performed at each stage. Here is provided an additional point of view, by showing, using the decomposition depicted in FIG. 7, where the pipelining registers are implanted in order to obtain the second, the third and fourth preferred embodiments introduced in these diagrams.

Figure 8:
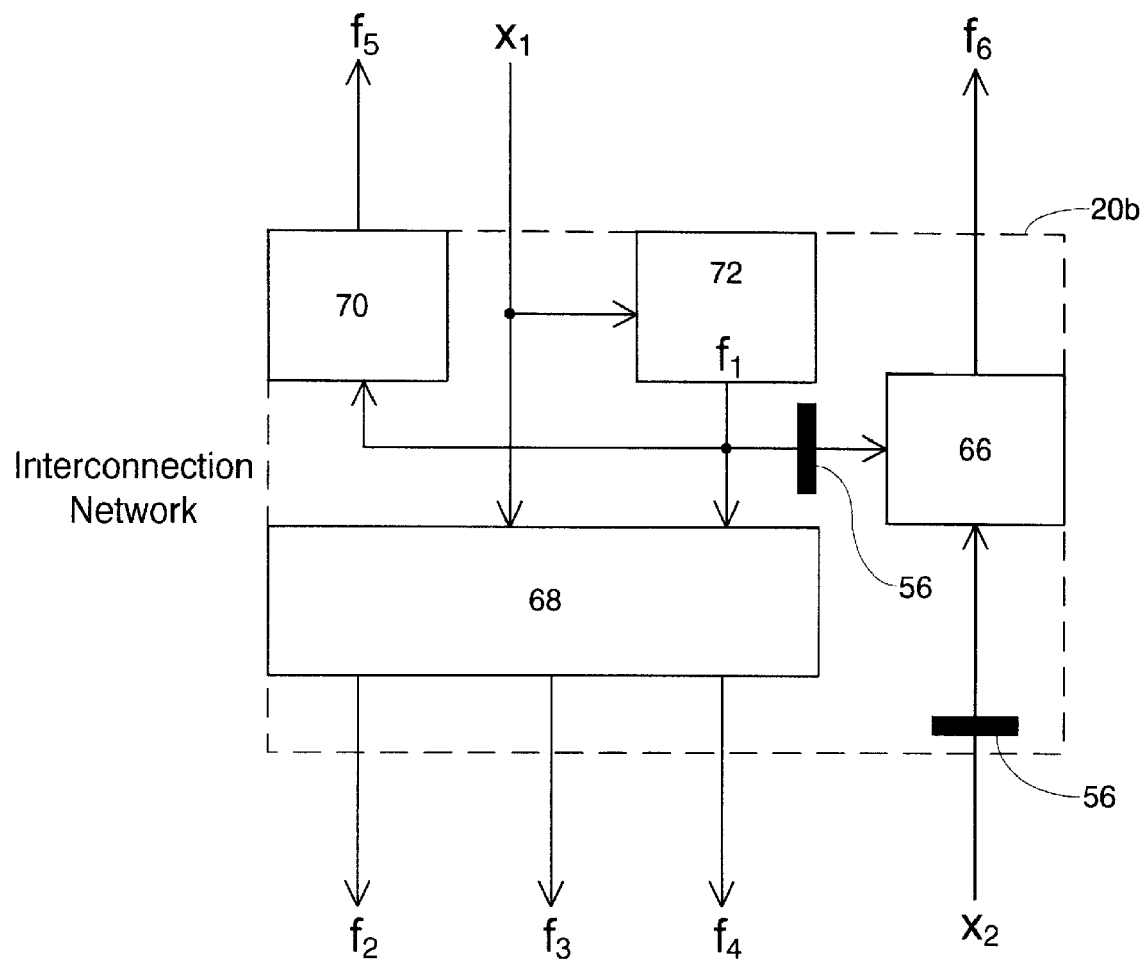
FIG. 8 shows how a preferred embodiment of the present invention based on pipelining is obtained by adding pipeline registers.

FIG. 8 shows how a preferred embodiment of the present invention based on pipelining is obtained by adding pipeline registers.

The second preferred embodiment is based on two pipeline stages (the first being (a) unified with (b) and the second being (c)) and on performing the activity ingredient C in the first stage. To obtain this embodiment, pipeline registers 56 are implanted as shown in FIG. 8, wherein they are symbolized by the black rectangles. Interconnection Network 20b also comprises sub-blocks, 66, 68, 70, and 72.

Figure 9:
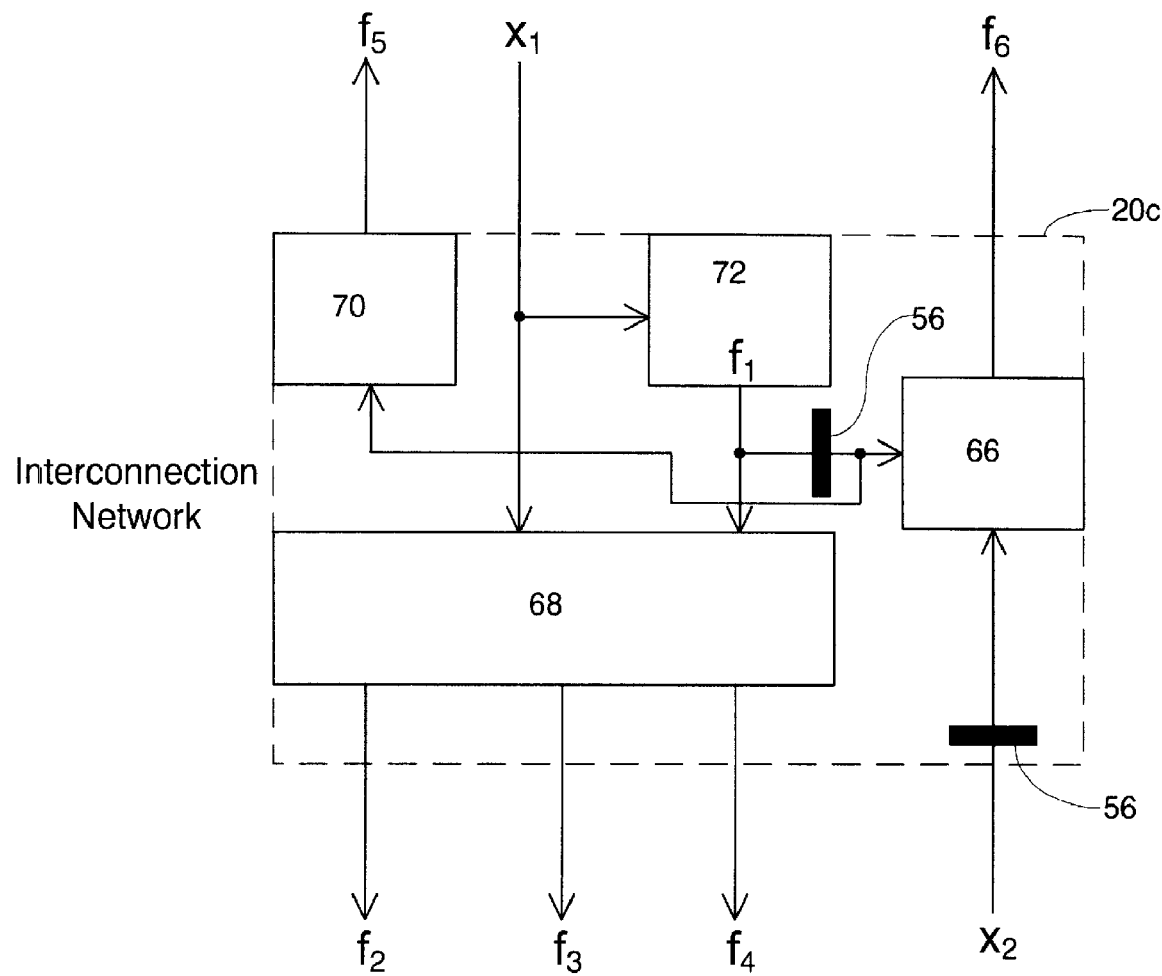
FIG. 9 shows another preferred embodiment based on pipelining.

FIG. 9 shows third preferred embodiment, which differs from the second (shown in FIG. 8) only in the fact that here the activity ingredient C is performed in the second stage. Interconnection Network 20c is also implanted with pipeline registers 56 and also comprises sub-blocks 66, 68, 70, and 72.

Figure 10:
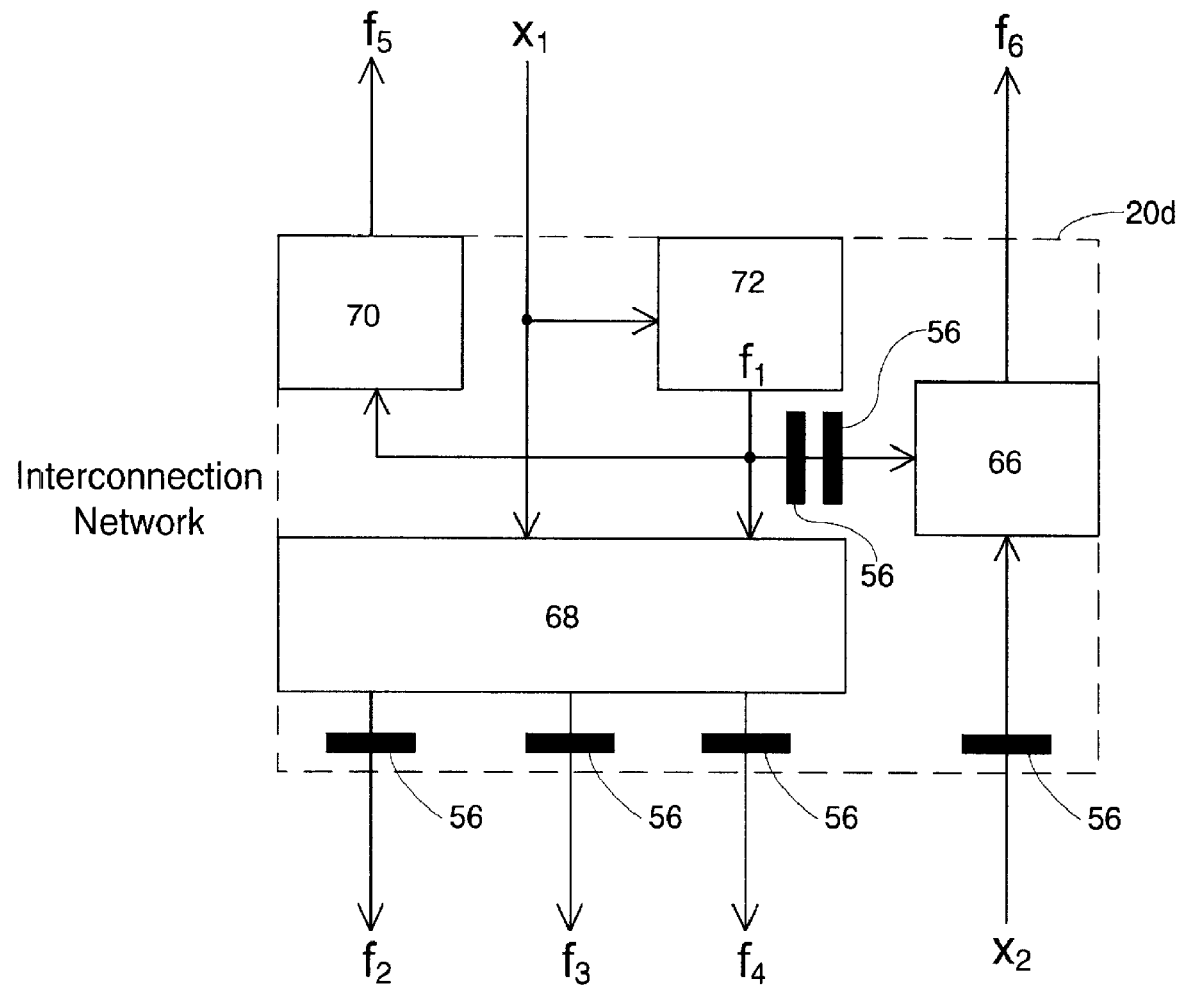
FIG. 10 shows yet another preferred embodiment based on pipelining.

FIG. 10 shows yet another preferred embodiment of the present invention based on pipelining.

To obtain the fourth preferred embodiment, which is based on three pipeline stages, interconnection network 20d is also provided with pipeline registers 56 implanted among sub-blocks 66, 68, 70, and 72 as shown in FIG. 10.

Note that sub-block 72 computes the function $f_1$ in each of the four preferred embodiments of interconnection network 20a, 20b, 20c, and 20d illustrated in FIGS. 7 through 10.

The number of pipeline stages in any pipelined system is known by those skilled in the art as the "pipeline depth". In the present invention, the pipeline depth is two or three. Where there are no arrangements for pipelining, the pipeline depth is considered to be one. The small pipeline depth of up to three in the present invention helps to prevent or significantly reduce the frequency of stoppages, otherwise known as "stalls" in the operation of the processing cores 24 (see FIG. 2), which may occur when the memory system is pipelined. This is so because it is well known by those skilled in the art that the processing cores 24 themselves can be pipelined. What is needed is a match between the pipeline stages of the memory system and those of processing cores 24. Namely, a processing core 24 should expect the outcome of its memory access initiative at the appropriate stage, one or two clock cycles later than the stage at which the initiative was taken.

The Delay of the Interconnection Network

In order to enable the processing cores 24 (see FIG. 2) to access the shared memory with a degree of efficiency comparable to that achieved in accessing a local memory, one requirement that must be met is that the delay of the interconnection network 20 will be sufficiently small. The present invention meets this requirement based on the following factors:

1) the combinational character of the interconnection network;
2) the number of switches along any path from side to side of the interconnection network depends logarithmically on the number n of processing cores, and
3) the useful property of a Baseline Network related to its physical-geometric layout on a planar surface in a manner that corresponds to FIG. 3, such that when it is bound within a rectangle, the maximal geometrical total length of any path from a port at one side of the Baseline Network to a port at the other side does not exceed the length of a diagonal of the bounding rectangle.

The delay time associated with the computation of the functions $f_1$, $f_2$, $f_3$ and $f_4$ defined in the earlier section above is expressed by $$T_{forward} = T_{bridge1} + \log_b n * T_{in\_to\_out} + T_{wire1}$$

where $T_{bridge1}$ is a delay time contributed by the elements 34 of routing, connection or bridging that appear in FIG. 2 outside of the read network 30 and the write network 32, and also the elements 34a in FIG. 4 outside of the Logarithmic Multistage Networks 54;

$T_{in\_to\_out}$ is a delay time of a switch with b ports at each side, of the type from which the Logarithmic Multistage Nnetworks 54 (see FIG. 4) are composed;

$T_{wire1}$ is a signal propagation time through wires, including amplifiers or repeaters that may be located along these wires; and $\log_b n$ stands for the logarithm according to base b of n, the number of processing cores 24 (see FIG. 2).

The delay time associated with the computation of the functions $f_5$ and $f_6$ defined above, after the functions $f_1$, $f_2$, $f_3$ and $f_4$ have already been computed and the values of the relevant variables have been already provided by the memory banks 22 (see FIG. 2), is bounded from above by $$T_{backward} = T_{bridge2} + \log_b n * T_{out\_to\_in} + T_{wire2}$$

where $T_{bridge2}$ is a delay time contributed by the elements of routing, connection or bridging that appear in FIG. 2 outside of the read network 30 and the write network 32, and also in FIG.

4 outside of the Logarithmic Multistage Networks 54. The two values $T_{bridge2}$ and $T_{bridge1}$ are not necessarily equal;

$T_{out\_to\_in}$ is a delay time of a switch with b ports at each side, of the type from which Logarithmic Multistage Networks 54 are composed. The two values $T_{out\_to\_in}$ and $T_{in\_to\_out}$ are not necessarily equal; and $T_{wire2}$ is a signal propagation time through wires, including amplifiers or repeaters that may be located along these wires. The two values $T_{wire2}$ and $T_{wire1}$ are not necessarily equal.

The delay times $T_{forward}$ and $T_{backward}$ are indeed sufficiently small: The components $T_{bridge1}$ and $T_{bridge2}$ depend only weakly on the number n of processing cores 24, the number k of memory banks 22 and the duplication factor m. The components $T_{in\_to\_out}$ and $T_{out\_to\_in}$ have contributions that depend only on n, logarithmically, through the factor $\log_b n$; this contribution therefore stands in analogy with the delay of a carry-look-ahead adder, a combinational system that is considered very compact and fast. The contributions of the components $T_{wire1}$ and $T_{wire2}$ to the delay times $T_{forward}$ and $T_{backward}$ depend on cumulative lengths of wires, which do not exceed the length of a diagonal of a bounding rectangle.

The Paths Formed in the Memory System

Definition of the Path Between a Processing Core and a Memory Bank

The paths in an interconnection network 20 are computed anew at every clock cycle. In this computation there is no need to take into account paths computed at earlier clock cycles; namely, there is no need to perform what is known by those skilled in the art as "rearrangement" of the paths. Another fact is that in determining the path between a processing core 24 and a memory bank 22 to which the processing core 24 initiates a reference, there is no need to take other processing cores' initiatives into account. There is only the need to return rejection replies when conflicts between paths occur as a result of a contest over ports of the interconnection network's building blocks. These two facts greatly simplify the computation of the paths, thereby helping the interconnection network 20 of the present invention to be simple, lean and lightweight.

A path in the interconnection network 20 (see FIG. 2) is computed from the memory address which the processing core 24 (see FIG. 2) submits, plus information about the type of access—whether it is a read or a write. When a processing core 24 initiates an access to an address in the shared memory space, this address unequivocally defines the following three items:

(i) which memory bank 22 is being accessed, and (ii) what is the internal address inside that memory bank 22, and in conjunction with the information about the type of access, the address unequivocally also defines:

(iii) the path in the interconnection network 20 through which the access to memory is achieved.

When two different processing cores 24 refer (at different times) to the same address in the shared space, they refer to the same memory bank 22 and to the same internal address inside that memory bank 22. However, the paths that they use are different, simply because the endpoints of the paths are not the same.

As stated hereinbefore, in a preferred embodiment of the present invention the number n of processing cores 24 as well as the number k of memory banks 22 and the duplication factor m are whole powers of two. Also, the relation $$k \leq n \times m$$

or equivalently $$\log_2 k \leq \log_2 n + \log_2 m$$

holds true. The overall number of bits that are included in the binary representation of a memory address, known by those skilled in the art as the "width of the address", is determined by the desired size of the shared memory space. This width is typically larger than the sum $\log_2 n + \log_2 m$. The value of the duplication factor m is typically smaller than the value of the number k of memory banks 22.

Figure 11:
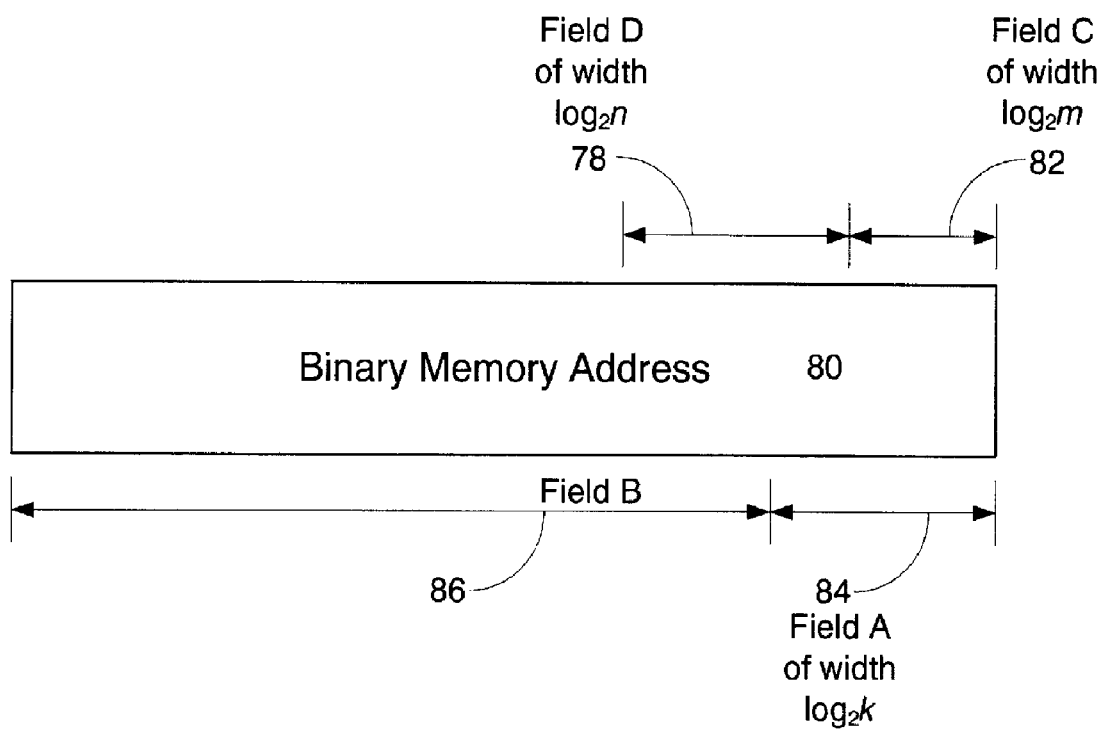
FIG. 11 shows the binary representation of a memory address issued by a processing core.

FIG. 11 shows the binary representation of a memory address issued by a processing core 24. The depiction in FIG. 11 of the representation of a binary memory address 80 issued by processing core 24 (as in FIG. 2) is used to explain the determination of items (i) (ii) and (iii) as defined heretofore.

The most significant bit of the address is the leftmost bit, and the least significant is the rightmost. The $\log_2 k$ rightmost bits 84, where k is the number of memory banks 22 (see FIG. 2), are denoted Field A here. The remaining bits 86 are denoted Field B. Also, the $\log_2 m$ rightmost bits 82, where m is the duplication factor, are denoted Field C, and the $\log_2 n$ bits 78 that are adjacent to Field C, where n is the number of processing cores, are denoted Field D. The three items (i), (ii), (iii) listed above are now described in further detail.

The Determination of (i)—the Memory Bank to which the Reference is Made

The index of the memory bank 22 to which the reference is made is determined by the contents of Field A 84 of the address. Addresses that are adjacent or sufficiently close to one another differ only in the value of Field A 84, and therefore such addresses are implemented in distinct memory banks.

A program that is being run on a multicore computer typically tends to make their processing cores issue subsequent references to nearby addresses, according to what is known by those skilled in the art as "the principle of locality of reference". Hence, such references tend to be scattered among distinct memory banks. This phenomenon, which is known by those skilled in the art as "interleaving", has the advantage of alleviating contests and conflicts. The conflicts relevant here are not related to paths in the interconnection network 20 (see FIG. 2) but rather to memory banks 22 (as in FIG. 2); however, these conflicts are nevertheless manifested and detected within the interconnection network 20, at elements 34,34a (see FIG. 2,4) thereof that are located at its perimeter, as explained further herein in the section entitled "Treating conflicts between paths".

The Determination of (ii)—the Internal Address Inside the Memory Bank

The address inside that memory bank 22 (see FIG. 2) to which the reference is made is determined by Field B 86 of the address.

The Determination of (iii)—the Path in the Interconnection Network through which the Access to Memory is Done In accordance with the topology of the interconnection network 20 as described above, the determination of the path includes:

(iii.1) determining whether the path passes through the read network 30 or through the write network 32 (see FIG. 2);

(iii.2) determining the Logarithmic Multistage Network 54 through which the path passes (see FIG. 4); and (iii.3) determining the internal path inside the logarithmic multistage network 54 (see FIG. 4).

The three components (iii.1), (iii.2) and (iii.3) constitute together a full and unequivocal determination of the path inside the interconnection network 20 through which the access of the processing core 24 to a memory bank 22 is done. These three components are detailed in the following table.

| Component | Details |
|---|---|
| (iii.1) Determining whether the path passes through the read network 30 or the write network 32. | This determination is done according to the information that the processing core 24 submits in conjunction with the memory address, regarding the type of requested access - whether it is a read or a write. |
| (iii.2) Determining the logarithmic multistage network 54 through which the path passes. | This determination is done according to the contents of Field C 82 of the address. When the duplication factor m is larger than one, the interleaving phenomenon explained above in the context of scattering the references among different memory banks 22 occurs here too; the current context is the usage of different Logarithmic Multistage Networks 54. Here the interleaving phenomenon has the advantage of alleviating contests and conflicts related to paths in the interconnection network 20. |
| (iii.3) Determining the internal path inside the logarithmic multistage network 54. | This determination is done according to the contents of Field D 78 of the address. The routing inside the logarithmic multistage network 54 is done according to the inherent routing laws of a logarithmic multistage network of the type chosen, in order to achieve the following: The path that begins at the side that is closer to the processing cores 24 (see FIG. 4) should end at the other side (namely the side that is closer to the memory banks 22) at the port whose index is given by Field D 78 of the address.<br>In a preferred embodiment of the present invention where the Logarithmic Multistage Networks 54 are of the Baseline type, and they are composed from switches that have b = 2 ports at each side (see an example in FIG. 3), the inherent routing law is as follows: First, if the value of the rightmost bit of Field D 78 is '0' then the path proceeds outwards of the first switch to which it entered via the port Out_0 of that switch; otherwise (namely the value is '1'), the path proceeds outwards via the port Out_1. Then, the path has to proceed through $\log_2 n - 1$ further switches, which belong to the same number of further stages. The same rule that applied to the first switch continues to apply for these further switches, with the $i^{th}$ rightmost bit of Field D 78 of the address determining the routing at the $i^{th}$ switch, for every i between 2 and $\log_2 n$.<br>In accordance with the present invention, the internal routing inside a Baseline Network is based on using the bits of the relevant field of the address from right to left. In this way the less significant bits determine the routing at the earlier stages of the Baseline Network. This is done in order to achieve an interleaving effect: When two addresses have identical contents in Field C 82, which means that they imply paths that use the same Logarithmic Multistage Network 54, it is still desirable to prevent a conflict between these two paths when the two addresses are relatively close to each other. Such relative closeness is expressed in an identity between the more significant bits of Field D 78 of the two addresses, while the less significant bits are non-identical.<br>According to the routing law defined above, the two paths that are implied by the two relatively close addresses part from each other already at the early stages of the Baseline Network. In this way a conflict is prevented.<br>When the multiplication product of the duplication factor m and the number n of processing cores 24 is greater than the number k of memory banks 22, the following happens: Each external port of the interconnection network 20, among those that are at the side of the memory banks 22, is connected (through an element 34a of routing, connection or bridging) to (m × n)/k consecutively indexed ports of a logarithmic multistage network 54 (see FIG. 4).. In such a situation there exist several different paths between a given processing core 24 and a given memory bank 22 that pass via the same logarithmic multistage network 54. Any two paths of this kind serve for accessing two different address subspaces that are confined to the given memory bank 22. What makes the difference in the characterization of such subspaces is the contents of the intersection between Field B 86 and Field D 78 of the address. |

Treating Conflicts Between Paths

Each processing core 24 (see FIG. 2) may take the initiative of accessing the shared memory at every clock cycle. The set of all initiatives submitted at a given clock cycle defines a corresponding set of requested paths between processing cores 24 and memory banks 22.

Conflicts may occur between different paths that belong to this set. In accordance with the principles of the present invention, the memory system detects such conflicts, and reacts to them by performing activity differently in the read network 30 and in the write network 32 (see FIG. 2). The read network 30 is distinguished from the write network 32 in supporting multicast, which contributes to a reduction of the number of conflicts. The support of multicast in the read network 30 is explained further herein in the section entitled "Support of multicast for accommodating read-related hot spots."

The following description relates to the detection of conflicts and the provision of the reactions to them as performed by an interconnection network, excluding a read network.

A conflict between two requested paths exists when they both pass via the same switch (such as 46—see FIG. 3) or other basic network element, and moreover—they both require the same port thereof at its side that is closer to memory banks 22 (see FIG. 2).

From the above description of the topology of interconnection network 20 (see FIG. 2) it is clear that such a port can belong to one of the following two types:

(I) A port of an internal switch of a Logarithmic Multistage Network 54. In a preferred embodiment of the present invention where the logarithmic multistage networks 54 are Baseline Networks composed from switches 46 with two ports at each side. This is an "Out_0" or an "Out_1" port (see FIG. 3).

(II) A port of an element that serves for routing, connection or bridging, such as those 34,34a that are depicted at the lower part of FIG. 2 or at the lower part of FIG. 4.

When the competition is over a port of type (I) above, this is indeed a competition over an interconnection resource. When the competition is over a port of type (II) above, this is actually a competition over a memory resource, because the two initiatives responsible for the conflicting paths pertain to the same memory bank 22 (see FIG. 2). However, the conflict is revealed and detected within interconnection network 20 in the same way in both cases.

The conflict is detected locally at the switch or at the other basic network element, when two or more requests to acquire the same port thereof at the side 52 (see FIG. 4) closer to memory banks 22 (see FIG. 2) are placed. These requests arrive via different ports at the side 50 (see FIG. 4) that is closer to the processing cores 24 (see FIG. 2). For example, when the relevant element is a switch 46 that resides inside a Baseline Network and has two ports at each side, two requests that arrive via the ports In_0 and In_1 may collide and create a conflict if both require the port Out_0, or if both require the port Out_1 (see FIG. 3). From the explanation above it is clear that for such a collision to occur in this example, it is necessary (but not sufficient) that the relevant bit of Field D 78 of the address will be identical at the two memory addresses which serve as targets for access.

Having explained how conflicts are detected, the following description relates to how the interconnection network 20 reacts to them (excluding the read network 30 shown in FIG. 2 which is discussed separately in the section entitled Support of multicast for accommodating read-related hot spots). A switch or another network element that detects a conflict takes a local decision to which of the conflicting incoming requests to grant the contested port.

In a preferred embodiment of the present invention, this decision relies only on fixed priorities assigned to the ports at the side closer to the processing cores 24, through which the requests arrive; while being fixed with respect to time, these priorities may depend on the identity of the requested port at the side closer to memory banks 22. This is a simple decision mechanism that contributes to the slenderness of the network.

In pursuance of its decision, the switch or other network element exports an approval reply via the port (at the side closer to the processing cores 24) that serves the winning request. It also exports rejection replies via the ports (also at the side closer to the processing cores 24) that serve the other requests involved in the contest. A rejection reply can be generated locally at the network element only in the case of detecting a conflict.

But a rejection reply can also be exported as a result of being forwarded, rather than as a result of being generated locally. A forwarded rejection reply supersedes any approval reply that the current network element has generated. Moreover, when a rejection reply arrives at a network element via a port thereof at the side of the memory banks 22 that has been granted in response to a request, this rejection reply must be forwarded. And it must be forwarded via the port at the other side (namely the side of processing cores 24) through which the winning request comes. A trail of rejection replies can thus be created, which starts at a network element that detects a conflict and generates a rejection reply locally, and then propagates through other network elements that are ever closer to the processing cores 24. Eventually the trail reaches the processing core 24 whose initiative is being rejected.

A processing core 24 that receives a rejection reply typically resubmits its initiative at a later clock cycle. The submission of the initiative at the current clock cycle has brought about the allocation of an incomplete path inside the interconnection network 20. This path is cut off at a network element which detects a conflict and takes a local decision to reject the submitted request. By occupying resources of the interconnection network 20, such an incomplete path may prevent the allocation of other paths and the fulfillment of other requests. Nevertheless, to keep the computation of the paths simple and fast, no reclaiming of the resources and no rearrangement of the paths are done.

The Number of Possible Paths

In order that the processing cores 24 (see FIG. 2) are enabled to access the shared memory with a degree of efficiency comparable to that achieved in accessing a local memory, a second requirement that must be met, in addition to the requirement discussed above concerning delays, is as follows: the number of paths between processing cores 24 and memory banks 22 that the interconnection network 20 can provide must be large enough. This requirement is not met when too many conflicts are created as a result of competition over the resources of the interconnection network 20 and over the memory banks 22 themselves.

However, in what follows it is pointed out that the desired objective concerning the number of paths is indeed attained in a memory system built in accordance with the principles of the present invention, by setting adequate values for the number of logarithmic multistage networks 54 (see FIG. 4) connected in parallel and for the number of memory banks 22 (see FIG. 2). An additional means for attaining the desired objective is the support of multicast in the read network 30 (see FIG. 2), which is presented later. An analytical result is now presented for the number of paths in the interconnection network 20 before the support of multicast is added to the read network 30.

It is possible to present in an analytical formula the average number of paths between processing cores 24 and memory banks 22 that are formed at a clock cycle, subject to the following three assumptions:

The first assumption is that the processing cores 24 operate independently of each other.

The second assumption is that the probability that a processing core 24 initiates a memory access at any clock cycle is given by some value p, which is uniform for all processing cores 24. (Hence, the probability that a processing core 24 does not initiate a memory reference at any given clock cycle is the complementary value 1−p.)

The third assumption is that any initiative to access memory may pertain to any memory address with the same probability.

The analytical formula presented below is intended for a situation where the ratio between read and write operations is such that all the logarithmic multistage networks 54 contained in the interconnection network 20 are used with equal frequency, irrespective of whether they serve for reads or for writes. This removes the complication associated with the distinction between reads and writes, for the sake of simplicity of the analysis.

It follows from the assumptions above that the average total number of paths that the processing cores 24 together request at any given clock cycle is equal to the multiplication product between n, the number of processing cores 24, and p, the probability of initiating a memory access. However, since the response to some of the requests may be a rejection reply due to conflicting paths, the average total number of paths that are actually created is smaller than n×p. When the Logarithmic Multistage Networks 54 (see FIG. 4) contained in both the read network 30 and the write network 32 (see FIG. 2) are composed from switches that have two ports at each side, the average number of paths that are actually created is given by the formula:

$$\text{(average number of paths)} = k \times \left\{ 1 - \left[ 1 - f^{\log 2n}\left(\frac{p}{m}\right) \right]^{\frac{n \times m}{k}} \right\}$$

where the meaning of the symbols is as follows:

The symbol n stands for the number of processing cores.

The symbol k stands for the number of memory banks.

The symbol m stands for the number of logarithmic multistage networks contained in the interconnection network (in the current context there is no distinction made between the logarithmic multistage network contained in the read network and those that are contained in the write network).

The symbol p stands for the probability that a processing core initiates a memory reference at any given clock cycle.

The symbol f stands for the mathematical mapping which maps any real number x to the number f(x) given by the expression $x-x^2/4$.

The expression $\log_2 n$ appearing as an upper index indicates repetitive invocations, $\log_2 n$ times, of the mapping f.

From the above formula it follows that when n and p are kept fixed, it is possible to make the average number of paths that are actually created as close as desired to n×p, through a sufficient increase of m and k. Namely, with a given number of processing cores 24 (as in FIG. 2) and a given probability that a processing core 24 initiates a memory access, it is possible to reduce the amount of conflicts to any desired level (although not to absolute zero); this is achieved by appropriately increasing the number of Logarithmic Multistage Networks 54 (see FIG. 4), and the number of partial banks which together embody the shared memory space.

In deriving the above formula it has been assumed for the sake of simplicity that all Logarithmic Multistage Networks 54 contained in an interconnection network are used with equal frequency, irrespective of whether they serve for reads or for writes. Relaxing this assumption necessitates the introduction into the analysis of a distinction between read and write operations and between read and write networks.

Yet for a read network 30 (see FIG. 2) there exists an additional means for reducing the amount of conflicts and thereby increasing the average number of paths that are actually created. This means is the support of multicast. It is intended for situations where the initiatives of the processing cores 24 tend to be interdependent, and moreover—many processing cores 24 want to read from the same memory address at the same clock cycle. Such an address constitutes a read-related hot spot.

Support of Multicast for Accommodating Read-related Hot Spots

It was explained heretofore how the part of an interconnection network 20 which does not include the read network 30 detects conflicts between paths and reacts to them. The read network 30 is distinguished from the rest of the interconnection network 20 in its support of multicast, which contributes to a reduction of the amount of conflicts. This is explained now.

A conflict is detected locally at a switch or at another basic element of the network, which identifies that there is more than one request to acquire the same port thereof, at the side that is closer to the memory banks 22. At the part of the interconnection network 20 which does not include the read network 30, the network element takes a local decision as to which among the colliding requests to grant the contested port. In the read network 30, however, the network element may take a different type of reaction, based on checking the memory addresses which the colliding initiatives want to read. When two or more addresses are identical, a multicast may takes place, which is manifested as follows: The network element transfers the contents arriving from the direction of the memory banks 22 via the contested port to all the ports at its other side (namely the side closer to the processing cores 24) which carry initiatives that want to read from the relevant memory address.

In one preferred embodiment, this relevant memory address is the one that is associated with the request that has the highest priority, and is selected according to the same simple selection scheme as described above for the rest of the network. In another preferred embodiment, this relevant memory address is the one that is associated with the maximal number of colliding requests. When the contents of a memory address is being multicast to more than one processing core, a multi-path with a tree topology is formed inside the read network 30 (see the example in FIG. 12).

Figure 12:
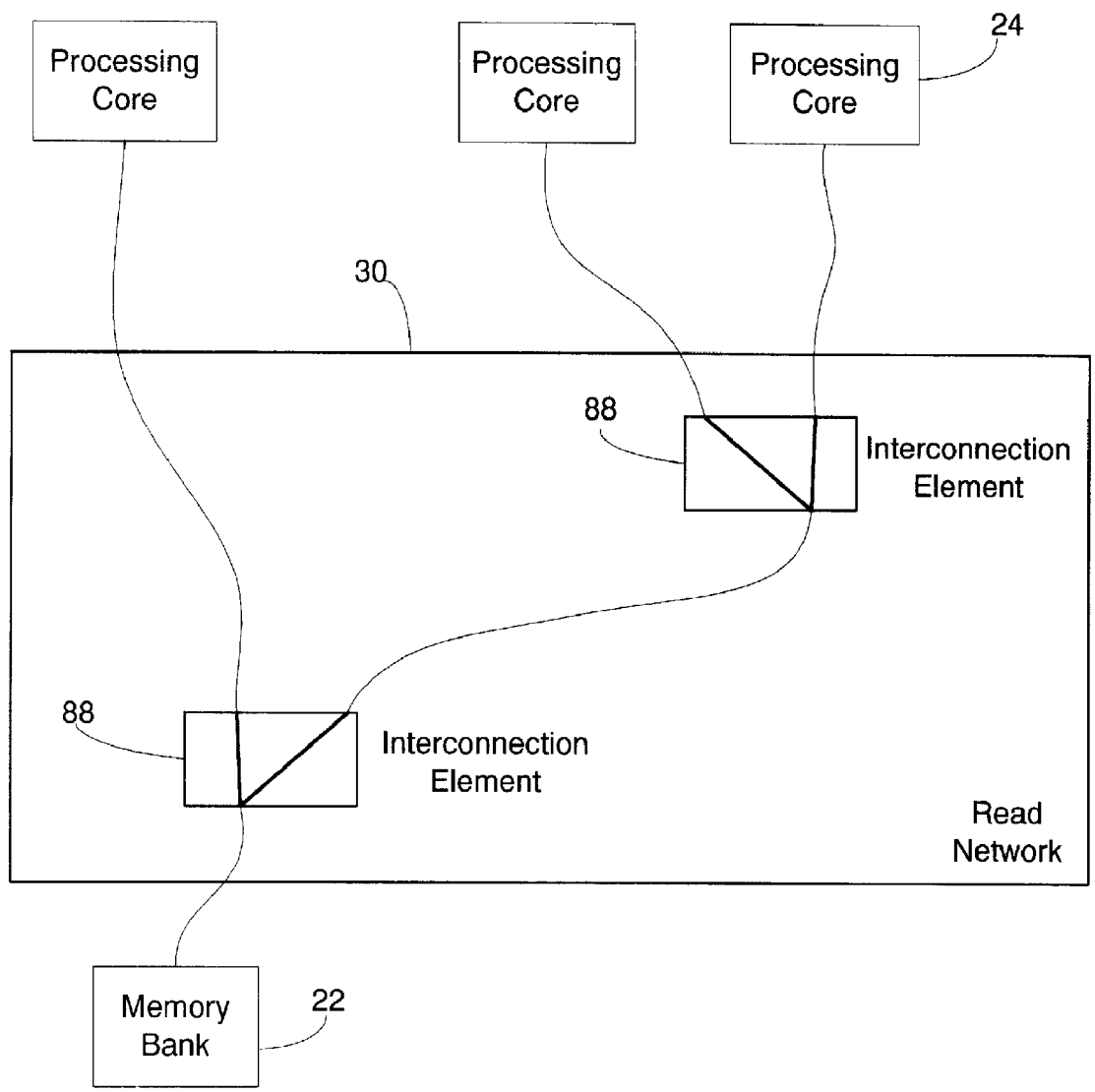
FIG. 12 shows an example of a multipath with a tree topology that is formed inside the read network when there is a multicast of the contents of a memory address.

FIG. 12 shows an example of a multipath with a tree topology that is formed inside the read network when there is a multicast of the contents of a memory address.

In this example, the multicast enables the reading of the same memory address at the same clock cycle by three processing cores 24. The memory address resides within the memory bank 22 depicted in FIG. 12. Multicast occurs here in read network 30 in two separate basic building blocks 88 which are labeled "Interconnection Element". Building blocks 88 represent elements which may have functions similar to those of switches 46 (see FIG. 3) and basic elements 34a (those that appear near the side 52 in FIG. 4), described heretofore.

Each of these two interconnection elements represented by building blocks 88 receives, via ports at the side that is closer to the processing cores 24, two requests to acquire the same port thereof at the other side in order to append this port to a path. While detecting the conflict, each of the two interconnection elements 88 also checks and finds that the two colliding requests were derived from read initiatives that pertain to the same memory address. Hence the multicast, whereby the interconnection element 88 transfers the contents arriving from the direction of the memory banks 22 via the contested port to two ports at the side closer to the processing cores 24, rather than one. The multicast is decided at each interconnection element 88 locally, but creates an overall picture of a multi-path with a tree topology.

By enabling the transfer of the contents stored in one memory address to multiple processing cores at the same clock cycle, the support of multicast in the read network 30 constitutes support for efficiently accommodating read-related hot spots.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. An interconnection network for storing and retrieving information, comprising:
 a plurality of interconnected switches;
 at least one external memory port for connecting to at least one memory bank, said at least one memory bank providing a shared space of memory addresses; and
 a plurality of external processor ports for connecting to a plurality of processors, said processors being programmed to submit memory access initiatives through said external processor ports for accessing said shared space of memory addresses through said interconnection network,
 wherein said interconnection network is configured to operate in a time regime wherein time is divided into clock cycles,
 to receive, upon every clock cycle, a plurality of said memory access initiatives, and
 to provide, in response to said memory access initiatives, respective memory access paths through said switches for accessing said at least one external memory port, wherein an address included in a given memory access initiative defines a route, within said interconnection network, of the memory access path that is provided in response to the given memory access initiative, and wherein each of said switches is configured, upon encountering a conflict between memory access paths requested by ones of said processors,
to allow providing at least one of the conflicting memory access paths, and
to return reply signals toward at least one of said ones of said processors, thereby indicating to said at least one of said processors whether it needs to resubmit a rejected memory access initiative in a later clock cycle.

2. The interconnection network of claim 1, wherein at least one of said switches is coupled to a pipelining stage configured to store access information related to at least one previous clock cycle.

3. The interconnection network of claim 1, wherein said memory access initiatives consist of read memory access initiatives.

4. The interconnection network of claim 1, comprising a read network and a write network.

5. The interconnection network of claim 1, wherein at least one of said switches is configured, upon encountering a number of simultaneous read memory access initiatives having the same memory address, to allow providing respective memory access paths in response to at least part of said number of read memory access initiatives.

6. The interconnection network of claim 1, wherein said switches are arranged as a plurality of sub-networks terminated with sub-network ports such that each of said external processor ports is connected to one sub-network port of each sub-network, thus reducing prevalence of conflicts between memory access paths within said interconnection network.

7. The interconnection network of claim 6, wherein each sub-network is connected to at least one external memory port and each external memory port is connected to more than one sub-networks port of a certain sub-network.

8. The interconnection network of claim 7, wherein the number of sub-network ports that are connected to each external memory port is equal to the number of said sub-networks, multiplied by the number of said external processor ports and divided by the number of said at least one external memory port.

9. The interconnection network of claim 6, wherein at least one of said sub-networks is a Baseline Network.

10. The interconnection network of claim 1, wherein a group of bits within the least significant hits portion of an address included in a given memory access initiative determines the memory bank containing said address, thereby achieving interleaved access to said at least one memory bank.

11. The interconnection network of claim 6, wherein a group of bits within the least significant bits portion of an address included in a given memory access initiative determines the sub-network that comprises the memory access path that is defined by said address, thereby achieving interleaved use of said sub-networks.

12. The interconnection network of claim 1, wherein the address included in the given memory access initiative uniquely defines the route of the memory access path that is provided by said interconnection network in response to the given memory access initiative.

13. The interconnection network of claim 1, comprising a Multistage Network.

14. The interconnection network of claim 13, wherein the Multistage Network architecture is one of Baseline Network or Omega Network.

15. A system for storing and retrieving information, comprising:
at least one memory bank, providing a shared space of memory addresses;
an interconnection network comprising a plurality of interconnected switches and connected to said at least one memory bank through at least one external memory port; and
a plurality of external processor ports for connecting to a plurality of processors, said processors programmed to submit memory access initiatives through said external processor ports for accessing said shared space of memory addresses through said interconnection network,
wherein said interconnection network is configured to operate in a time regime wherein time is divided into clock cycles,
to receive, upon every clock cycle, a plurality of said memory access initiatives through said external processor ports, and
to provide, in response to said memory access initiatives, respective memory access paths through said switches for accessing said at least one external memory port, wherein an address included in a given memory access initiative defines a route, within said interconnection network, of the memory access path that is provided in response to the given memory access initiative, and
wherein each of said switches is configured, upon encountering a conflict between memory access paths requested by ones of said processors,
to allow providing at least one of the conflicting memory access paths, and
to return reply signals toward at least one of said ones of said processors, thus indicating to said at least one of said processors if it needs to resubmit in a later clock cycle a rejected memory access initiative.

16. A method for storing and retrieving information through an interconnection network, said interconnection network comprising
a plurality of interconnected switches,
at least one external memory port for connecting to at least one memory bank, said at least one memory bank providing a shared space of memory addresses, and
a plurality of external processor ports for connecting to a plurality of processors, said processors being programmed to submit memory access initiatives through said external processor ports for accessing said shared space of memory addresses through said interconnection network,
wherein said interconnection network is configured
to operate in a time regime wherein time is divided into clock cycles, and
to provide, in response to said memory access initiatives, respective memory access paths through said switches for accessing said at least one external memory port, wherein an address included in a given memory access initiative defines a route, within said interconnection network, of the memory access path that is provided in response to the given memory access initiative,
said method comprising the steps of:
receiving, upon every clock cycle, a plurality of said memory access initiatives through said external processor parts;

deciding locally in each switch that encounters a conflict between memory access paths requested by ones of said processors, which of the conflicting memory access paths to allow; and returning, from said each switch, reply signals toward at least one of said ones of said processors, thereby indicating said at least one of said processors if it needs to resubmit in a later clock cycle a rejected memory access initiative.

17. The method of claim 16, wherein the deciding step comprises allowing a number of said conflicting memory access paths having the same memory address to be simultaneously provided.

* * * * *